US012775072B2

(12) United States Patent
Rekow et al.

(10) Patent No.: US 12,775,072 B2
(45) Date of Patent: Oct. 27, 2026

(54) DEVICES AND TECHNIQUES FOR OSCILLATORY SCANNING IN LiDAR SENSORS

(71) Applicant: VELODYNE LIDAR USA, INC., San Jose, CA (US)

(72) Inventors: Mathew Noel Rekow, Ben Lomond, CA (US); Stephen S. Nestinger, Fremont, CA (US); Nathan Wilkerson, San Jose, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 1114 days.

(21) Appl. No.: 17/566,997

(22) Filed: Dec. 31, 2021

(65) Prior Publication Data

US 2023/0213621 A1 Jul. 6, 2023

(51) Int. Cl.

*G01S 7/481* (2006.01)
*G01S 7/4865* (2020.01)
*G01S 17/89* (2020.01)

(52) U.S. Cl.

CPC .......... *G01S 7/4817* (2013.01); *G01S 7/4815* (2013.01); *G01S 7/4816* (2013.01); *G01S 7/4865* (2013.01); *G01S 17/89* (2013.01)

(58) Field of Classification Search

CPC .......... G01S 17/89; G01S 17/10; G01S 17/42; G01S 7/48–51

See application file for complete search history.

(56) References Cited

U.S. PATENT DOCUMENTS

| | | | | |
|---|---|---|---|---|
| 11,294,040 B1 * | 4/2022 | Tsai | G01S 7/4865 | |
| 2010/0302528 A1 * | 12/2010 | Hall | G01S 7/4815 | 702/159 |
| 2011/0040482 A1 * | 2/2011 | Brimble | G01S 7/4814 | 356/5.01 |
| 2014/0126590 A1 * | 5/2014 | Kimura | H04N 9/3194 | 372/24 |
| 2016/0084651 A1 * | 3/2016 | Hinderling | G01S 17/08 | 356/4.01 |
| 2017/0269215 A1 * | 9/2017 | Hall | G01S 17/89 | |
| 2017/0350983 A1 * | 12/2017 | Hall | G01S 7/487 | |
| 2019/0098233 A1 * | 3/2019 | Gassend | H04N 23/698 | |
| 2019/0391243 A1 * | 12/2019 | Nicolaescu | G01S 17/42 | |

(Continued)

*Primary Examiner* — Yuqing Xiao
*Assistant Examiner* — Chia-Ling Chen
(74) *Attorney, Agent, or Firm* — Kilpatrick Townsend & Stockton LLP

(57) ABSTRACT

A light detection and ranging (LIDAR) device including a plurality of illumination sources, each of the plurality of illumination sources configured to emit illumination light, an optical scanning device disposed in an optical path of the plurality of illumination sources, the optical scanning device configured to oscillate about a first axis to redirect the illumination light emitted by the plurality of illumination sources from the LIDAR device into a three-dimensional (3-D) environment, a plurality of photosensitive detectors, each of the plurality of photosensitive detectors configured to detect a respective portion of return light reflected from the 3-D environment when illuminated by a respective portion of the illumination light, and a scanning mechanism configured to rotate the optical scanning device about a second axis orthogonal to the first axis.

24 Claims, 21 Drawing Sheets

(56) References Cited

U.S. PATENT DOCUMENTS

| | | | | |
|---|---|---|---|---|
| 2020/0278427 | A1* | 9/2020 | Chen | G01S 7/4972 |
| 2021/0033394 | A1* | 2/2021 | Sasaki | G01C 3/06 |
| 2021/0109222 | A1* | 4/2021 | Cho | G01S 17/88 |
| 2022/0113429 | A1* | 4/2022 | Solomentsev | G01S 7/4817 |
| 2022/0260722 | A1* | 8/2022 | Wang | H02K 7/083 |
| 2022/0373654 | A1* | 11/2022 | Benscoter | G01S 7/484 |
| 2023/0028159 | A1* | 1/2023 | Yang | G02B 27/0955 |

* cited by examiner

DEVICES AND TECHNIQUES FOR OSCILLATORY SCANNING IN LiDAR SENSORS

TECHNICAL FIELD

The present disclosure relates to light detection and ranging ("LIDAR") based three-dimensional (3-D) point cloud measuring systems.

BACKGROUND INFORMATION

Light detection and ranging ("LiDAR") systems measure the attributes of their surrounding environments (e.g., shape of a target, contour of a target, distance to a target, etc.) by illuminating the target with light (e.g., laser light) and measuring the reflected light with sensors. Differences in laser return times and/or wavelengths can then be used to make digital, three-dimensional ("3D") representations of a surrounding environment. LiDAR technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), and so forth. Depending on the application and associated field of view (FOV), multiple channels or laser beams may be used to produce images in a desired resolution. A LiDAR system with greater numbers of channels can generally generate larger numbers of pixels.

In a multi-channel LiDAR device, optical transmitters are paired with optical receivers to form multiple "channels." In operation, each channel's transmitter emits an optical signal (e.g., laser beam) into the device's environment and each channel's receiver detects the portion of the return signal that is reflected back to the receiver by the surrounding environment. In this way, each channel provides "point" measurements of the environment, which can be aggregated with the point measurements provided by the other channel(s) to form a "point cloud" of measurements of the environment.

Advantageously, the measurements collected by any LiDAR channel may be used to determine the distance ("range") from the device to the surface in the environment that reflected the channel's transmitted optical signal back to the channel's receiver. In some cases, the range to a surface may be determined based on the time of flight (TOF) of the channel's signal (e.g., the time elapsed from the transmitter's emission of the optical signal to the receiver's reception of the return signal reflected by the surface). In other cases, the range may be determined based on the wavelength (or frequency) of the return signal(s) reflected by the surface.

In many operational scenarios, a 3-D point cloud is advantageous. A number of schemes have been used to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be used to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time may be limited due to limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is advantageous to see over a broad field of view. For example, in an autonomous vehicle application, the vertical field of view preferably extends down as close as possible to see the ground in front of the vehicle. In addition, the vertical field of view preferably extends above the horizon, in the event the car enters a dip in the road. In addition, it is preferable to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is hereby incorporated herein by reference in its entirety.

In many applications, sequences of pulses are emitted. The direction of each pulse (or pulse sequence) is sequentially varied in rapid succession. In these examples, a distance measurement associated with each individual pulse (or pulse sequence) can be considered a pixel, and a collection of pixels emitted and captured in rapid succession (e.g., "point cloud") can be rendered as an image or analyzed for other reasons (e.g., detecting obstacles). In some examples, viewing software is used to render the resulting point clouds as images that appear 3-D to a user. Different schemes can be used to depict the distance measurements as 3-D images that appear as if they were captured by a live action camera.

Improvements in the opto-mechanical design of LIDAR systems are desired, while maintaining high levels of imaging resolution and range, or improving thereupon.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Disclosed herein are devices and techniques for oscillatory scanning in LIDAR sensors. At least one aspect of the present disclosure is directed to a light detection and ranging (LIDAR) device. The LIDAR device includes a plurality of illumination sources, each of the plurality of illumination sources configured to emit illumination light, an optical scanning device disposed in an optical path of the plurality of illumination sources, the optical scanning device configured to oscillate about a first axis to redirect the illumination light emitted by the plurality of illumination sources from the LIDAR device into a three-dimensional (3-D) environment, a plurality of photosensitive detectors, each of the plurality of photosensitive detectors configured to detect a respective portion of return light reflected from the 3-D environment when illuminated by a respective portion of the illumination light, and a scanning mechanism configured to rotate the optical scanning device about a second axis orthogonal to the first axis.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

DETAILED DESCRIPTION

Reference will now be made in detail to background examples and some embodiments of the invention, examples of which are illustrated in the accompanying drawings.

Some Examples of LIDAR Systems

Figure 1:
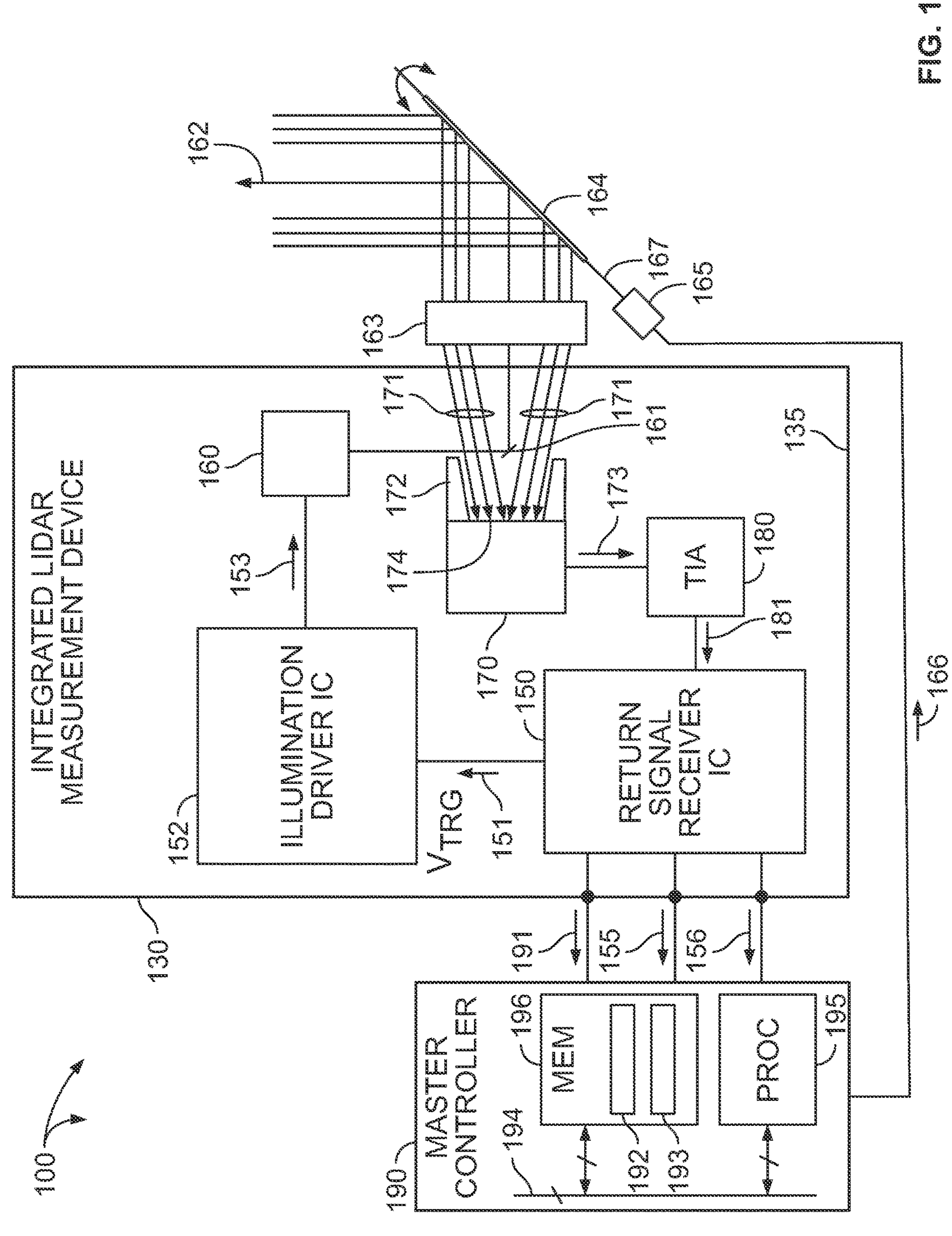
FIG. 1 is a simplified diagram illustrative of a 3-D LIDAR system 100, according to some embodiments.

FIG. 1 depicts a LIDAR measurement system 100 in one embodiment. LIDAR measurement system 100 includes a master controller 190 and one or more integrated LIDAR measurement devices 130. An integrated LIDAR measurement device 130 includes a return signal receiver integrated circuit (IC) 150, an illumination driver integrated circuit (IC) 152, an illumination source 160, a photodetector 170, and a trans-impedance amplifier (TIA) 180. Each of these elements is mounted to a common substrate 135 (e.g., printed circuit board) that provides mechanical support and electrical connectivity among the elements.

Illumination source 160 emits a measurement pulse of illumination light 162 in response to a pulse of electrical current 153. In some embodiments, the illumination source 160 is laser based (e.g., laser diode). In some embodiments, the illumination source 160 is based on one or more light emitting diodes. In general, any suitable pulsed illumination source may be contemplated. Illumination light 162 exits LIDAR measurement device 100 and reflects from an object in the surrounding 3-D environment under measurement. A portion of the reflected light is collected as return measurement light 171 associated with the illumination light 162. As depicted in FIG. 1, illumination light 162 emitted from integrated LIDAR measurement device 130 and corresponding return measurement light 171 directed toward integrated LIDAR measurement device share a common optical path.

In one aspect, the illumination light 162 is focused and projected toward a particular location in the surrounding environment by one or more beam shaping optical elements 163 and a beam scanning device 164 of LIDAR measurement system 100. In a further aspect, the return measurement light 171 is directed and focused onto photodetector 170 by beam scanning device 164 and the one or more beam shaping optical elements 163 of LIDAR measurement system 100. The beam scanning device 164 is employed in the optical path between the beam shaping optics and the environment under measurement. The beam scanning device 164 effectively expands the field of view and increases the sampling density within the field of view of the 3-D LIDAR system.

In the embodiment depicted in FIG. 1, beam scanning device 164 is a moveable mirror element that is rotated about an axis of rotation 167 by rotary actuator 165. Command signals 166 generated by master controller 190 are communicated from master controller 190 to rotary actuator 165. In response, rotary actuator 165 scans moveable mirror element 164 in accordance with a desired motion profile.

Integrated LIDAR measurement device 130 includes a photodetector 170 having an active sensor area 174. As depicted in FIG. 1, illumination source 160 is located outside the field of view of the active area 174 of the photodetector. As depicted in FIG. 1, an overmold lens 172 is mounted over the photodetector 170. The overmold lens 172 includes a conical cavity that corresponds with the ray acceptance cone of return light 171. Illumination light 162 from illumination source 160 is injected into the detector reception cone by a fiber waveguide. An optical coupler optically couples illumination source 160 with the fiber waveguide. At the end of the fiber waveguide, a mirror element 161 is oriented at a 45 degree angle with respect to the waveguide to inject the illumination light 162 into the cone of return light 171. In one embodiment, the end faces of fiber waveguide are cut at a 45 degree angle and the end faces are coated with a highly reflective dielectric coating to provide a mirror surface. In some embodiments, the waveguide includes a rectangular shaped glass core and a polymer cladding of lower index of refraction. In some embodiments, the entire optical assembly is encapsulated with a material having an index of refraction that closely matches the index of refraction of the polymer cladding. In this manner, the waveguide injects the illumination light 162 into the acceptance cone of return light 171 with minimal occlusion.

The placement of the waveguide within the acceptance cone of the return light 171 projected onto the active sensing area 174 of detector 170 is selected to ensure that the illumination spot and the detector field of view have maximum overlap in the far field.

As depicted in FIG. 1, return light 171 reflected from the surrounding environment is detected by photodetector 170. In some embodiments, photodetector 170 is an avalanche photodiode. Photodetector 170 generates an output signal 173 that is amplified by an analog trans-impedance amplifier (TIA) 180. However, in general, the amplification of output signal 173 may include multiple, amplifier stages. In this sense, an analog trans-impedance amplifier is provided by way of non-limiting example, as many other analog signal amplification schemes may be contemplated within the scope of this patent document. Although TIA 180 is depicted in FIG. 1 as a discrete device separate from the receiver IC 150, in general, TIA 180 may be integrated with receiver IC 150. In some embodiments, it is preferable to integrate TIA 180 with receiver IC 150 to save space and reduce signal contamination.

The amplified signal 181 is communicated to return signal receiver IC 150. Receiver IC 150 includes timing circuitry and a time-to-digital converter that estimates the time of flight of the measurement pulse from illumination source 160, to a reflective object in the 3-D environment, and back to the photodetector 170. A signal 155 indicative of the estimated time of flight is communicated to master controller 190 for further processing and communication to a user of the LIDAR measurement system 100. In addition, return signal receiver IC 150 is configured to digitize segments of the return signal 181 that include peak values (i.e., return pulses), and communicate signals 156 indicative of the digitized segments to master controller 190. In some embodiments, master controller 190 processes these signal segments to identify properties of the detected object. In some embodiments, master controller 190 communicates signals 156 to a user of the LIDAR measurement system 100 for further processing.

Master controller 190 is configured to generate a pulse command signal 191 that is communicated to receiver IC 150 of integrated LIDAR measurement device 130. Pulse command signal 191 is a digital signal generated by master controller 190. Thus, the timing of pulse command signal 191 is determined by a clock associated with master controller 190. In some embodiments, the pulse command signal 191 is directly used to trigger pulse generation by illumination driver IC 152 and data acquisition by receiver IC 150. However, illumination driver IC 152 and receiver IC 150 do not share the same clock as master controller 190. For this reason, precise estimation of time of flight becomes much more computationally tedious when the pulse command signal 191 is directly used to trigger pulse generation and data acquisition.

In general, a LIDAR measurement system includes a number of different integrated LIDAR measurement devices 130 each emitting a pulsed beam of illumination light from the LIDAR device into the surrounding environment and measuring return light reflected from objects in the surrounding environment.

In these embodiments, master controller 190 communicates a pulse command signal 191 to each different integrated LIDAR measurement device. In this manner, master controller 190 coordinates the timing of LIDAR measurements performed by any number of integrated LIDAR measurement devices. In a further aspect, beam shaping optical elements 163 and beam scanning device 164 are in the optical path of the illumination pulses and return measurement pulses associated with each of the integrated LIDAR measurement devices. In this manner, beam scanning device 164 directs each illumination pulse and return measurement pulse of LIDAR measurement system 100.

In the depicted embodiment, receiver IC 150 receives pulse command signal 191 and generates a pulse trigger signal, $V_{TRG}$ 151, in response to the pulse command signal 191. Pulse trigger signal 151 is communicated to illumination driver IC 152 and directly triggers illumination driver IC 152 to electrically couple illumination source 160 to a power supply (not shown) and generate a pulse of illumination light 162. In addition, pulse trigger signal 151 directly triggers data acquisition of return signal 181 and associated time of flight calculation. In this manner, pulse trigger signal 151 generated based on the internal clock of receiver IC 150 is employed to trigger both pulse generation and return pulse data acquisition. This ensures precise synchronization of pulse generation and return pulse acquisition which enables precise time of flight calculations by time-to-digital conversion.

Figure 2:
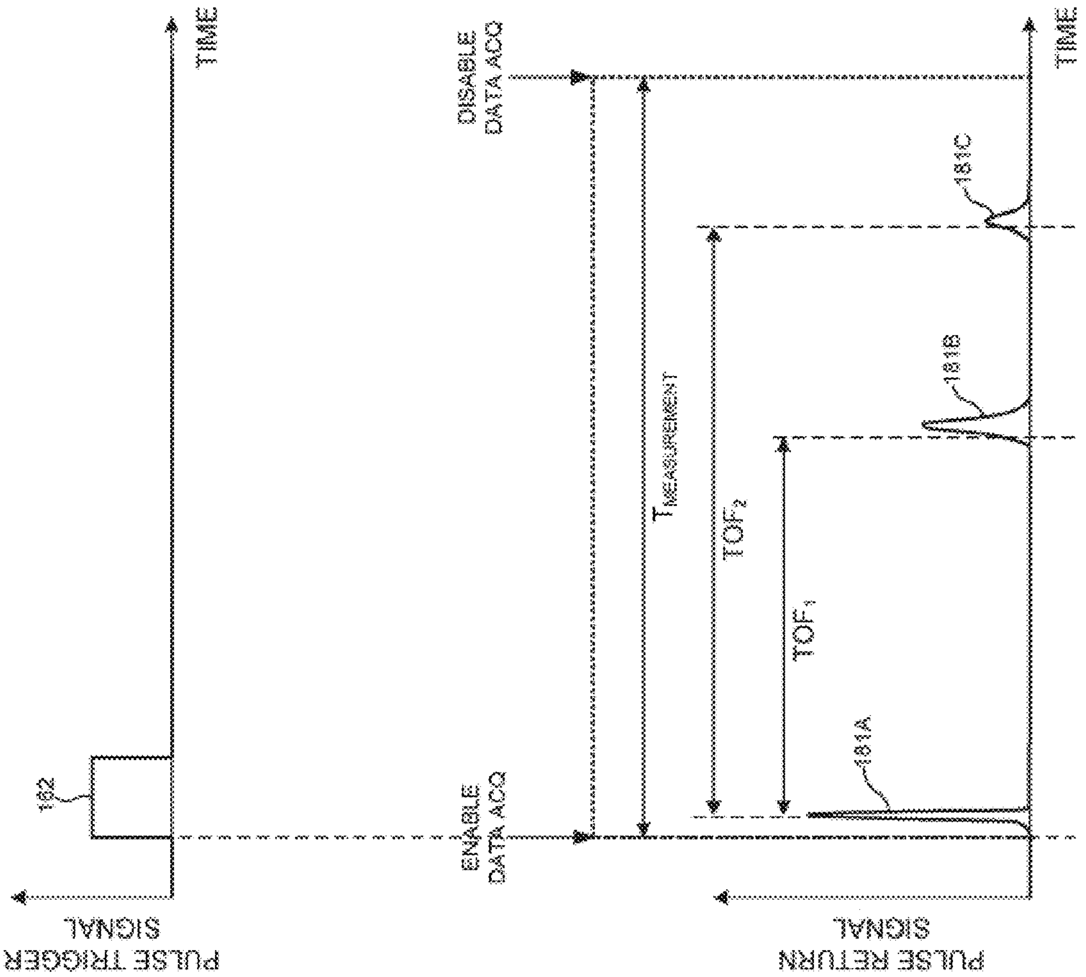
FIG. 2 depicts an illustration of the timing of emission of a pulsed measurement beam and capture of the returning measurement pulse.

FIG. 2 depicts an illustration of the timing associated with the emission of a measurement pulse from an integrated LIDAR measurement device 130 and capture of the returning measurement pulse. As depicted in FIG. 2, a measurement is initiated by the rising edge of pulse trigger signal 162 generated by receiver IC 150. As depicted in FIGS. 1 and 2, an amplified, return signal 181 is received by receiver IC 150. As described hereinbefore, a measurement window (i.e., a period of time over which collected return signal data is associated with a particular measurement pulse) is initiated by enabling data acquisition at the rising edge of pulse trigger signal 162. Receiver IC 150 controls the duration of the measurement window, $T_{measurement}$, to correspond with the window of time when a return signal is expected in response to the emission of a measurement pulse sequence. In some examples, the measurement window is enabled at the rising edge of pulse trigger signal 162 and is disabled at a time corresponding to the time of flight of light over a distance that is approximately twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 2, return signal 181 includes three return measurement pulses that correspond with the emitted measurement pulse. In general, signal detection is performed on all detected measurement pulses. Further signal analysis may be performed to identify the closest valid signal 181B (i.e., first valid instance of the return measurement pulse), the strongest signal, and the furthest valid signal 181C (i.e., last valid instance of the return measurement pulse in the measurement window). Any of these instances may be reported as potentially valid distance measurements by the LIDAR system.

Internal system delays associated with emission of light from the LIDAR system (e.g., signal communication delays and latency associated with the switching elements, energy storage elements, and pulsed light emitting device) and delays associated with collecting light and generating signals indicative of the collected light (e.g., amplifier latency, analog-digital conversion delay, etc.) contribute to errors in the estimation of the time of flight of a measurement pulse of light. Thus, measurement of time of flight based on the elapsed time between the rising edge of the pulse trigger signal 162 and each valid return pulse (i.e., 181B and 181C) introduces undesirable measurement error. In some embodiments, a calibrated, pre-determined delay time is employed to compensate for the electronic delays to arrive at a corrected estimate of the actual optical time of flight. However, the accuracy of a static correction to dynamically changing electronic delays is limited. Although, frequent re-calibrations may be employed, this comes at a cost of computational complexity and may interfere with system up-time.

In another aspect, receiver IC 150 measures time of flight based on the time elapsed between the detection of a detected pulse 181A due to internal cross-talk between the illumination source 160 and photodetector 170 and a valid return pulse (e.g., 181B and 181C). In this manner, systematic delays are eliminated from the estimation of time of flight. Pulse 181A is generated by internal cross-talk with effectively no distance of light propagation. Thus, the delay in time from the rising edge of the pulse trigger signal and the instance of detection of pulse 181A captures all of the systematic delays associated with illumination and signal detection. By measuring the time of flight of valid return pulses (e.g., return pulses 181B and 181C) with reference to detected pulse 181A, all of the systematic delays associated with illumination and signal detection due to internal cross-talk are eliminated. As depicted in FIG. 2, receiver IC 150 estimates the time of flight, $TOF_1$, associated with return pulse 181B and the time of flight, $TOF_2$, associated with return pulse 181C with reference to return pulse 181A.

In some embodiments, the signal analysis is performed by receiver IC 150, entirely. In these embodiments, signals 155 communicated from integrated LIDAR measurement device 130 include an indication of the time of flight determined by receiver IC 150. In some embodiments, signals 156 include digitized segments of return signal 181 generated by receiver IC 150. These raw measurement signal segments are processed further by one or more processors located on board the 3-D LIDAR system, or external to the 3-D LIDAR system to arrive at another estimate of distance, an estimate of one of more physical properties of the detected object, or a combination thereof.

Figure 3:
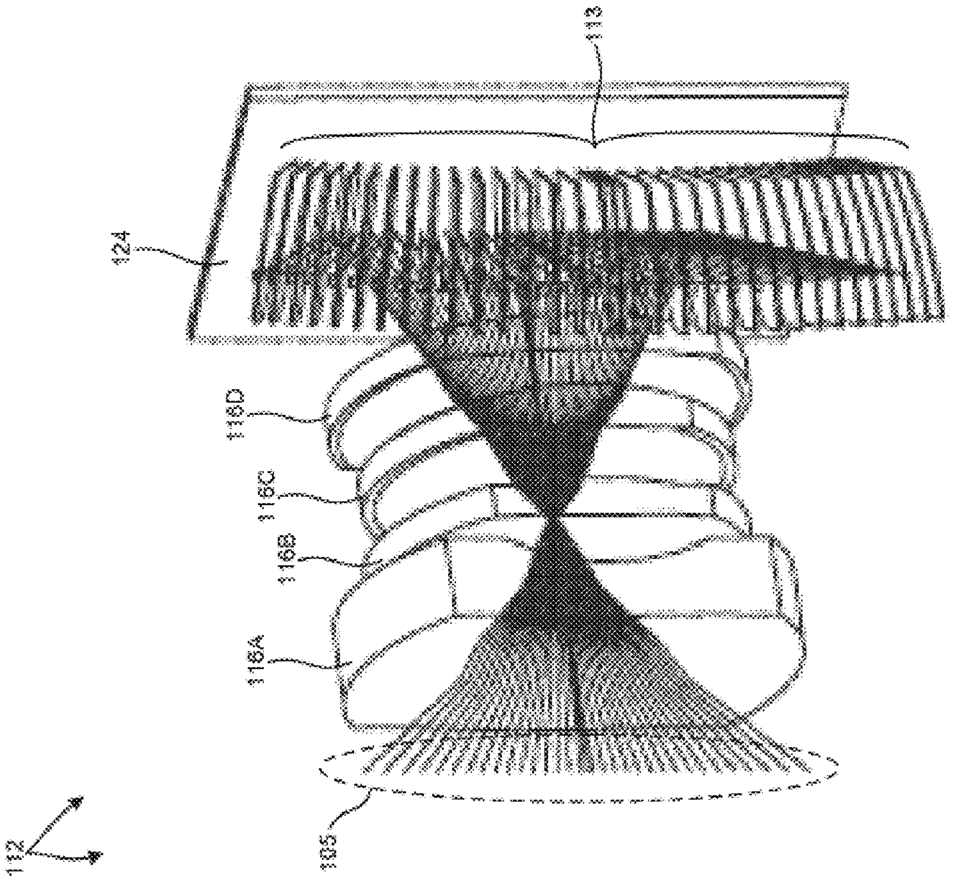
FIG. 3 depicts a view of light emission/collection engine 112 of 3-D LIDAR system 100.

FIG. 3 depicts a light emission/collection engine 112 in one embodiment. Light emission/collection engine 112 includes an array of integrated LIDAR measurement devices 113. Each integrated LIDAR measurement device includes a light emitting element, a light detecting element, and associated control and signal conditioning electronics integrated onto a common substrate (e.g., electrical board). In one example, each LIDAR measurement device of the integrated array 113 corresponds to the LIDAR measurement device 130 of FIG. 1.

Light emitted from each integrated LIDAR measurement device is reflected by mirror 124 and passes through beam shaping optical elements 116 that collimate the emitted light to generate a beam of illumination light projected from the 3-D LIDAR system into the environment. In this manner, an array of beams of light 105, each emitted from a different LIDAR measurement device are emitted from light emission/collection engine 112 as depicted in FIG. 3. In general, any number of LIDAR measurement devices can be arranged to simultaneously emit any number of light beams from light emission/collection engine 112. Light reflected from an object in the environment due to its illumination by a particular LIDAR measurement device is collected by beam shaping optical elements 116. The collected light passes through beam shaping optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

Figure 4:
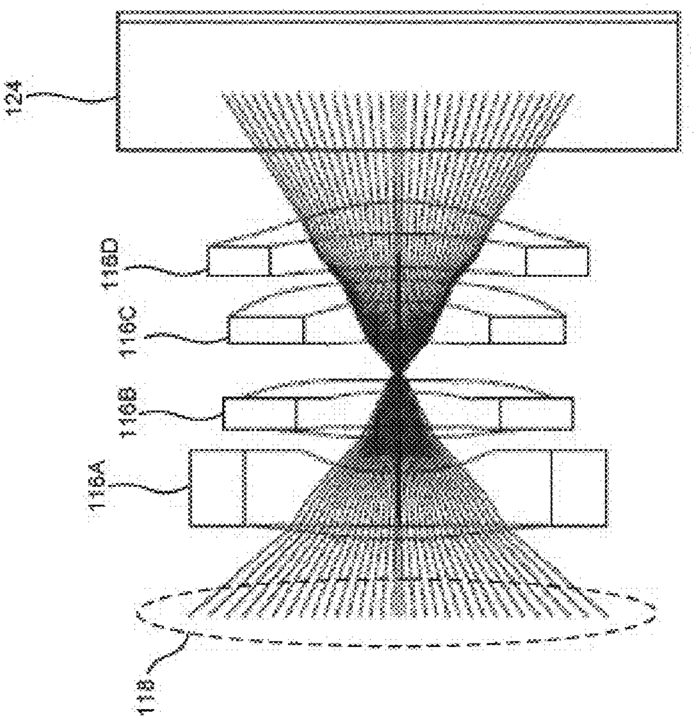
FIG. 4 depicts a view of collection optics 116 of 3-D LIDAR system 100 in greater detail.

FIG. 4 depicts a view of beam shaping optical elements 116 in greater detail. As depicted in FIG. 4, beam shaping optical elements 116 include four lens elements 116A-D arranged to focus collected light 118 onto each detector of the array of integrated LIDAR measurement devices 113. In the embodiment depicted in FIG. 4, light passing through optics 116 is reflected from mirror 124 and is directed onto each detector of the array of integrated LIDAR measurement devices. In some embodiments, one or more of the beam shaping optical elements 116 is constructed from one or more materials that absorb light outside of a predetermined wavelength range. The predetermined wavelength range includes the wavelengths of light emitted by the array of integrated LIDAR measurement devices 113. In one example, one or more of the lens elements are constructed from a plastic material that includes a colorant additive to absorb light having wavelengths less than infrared light generated by each of the array of integrated LIDAR measurement devices 113. In one example, the colorant is Epolight 7276A available from Aako BV (The Netherlands). In general, any number of different colorants can be added to any of the plastic lens elements of optics 116 to filter out undesired spectra.

Figure 5A:
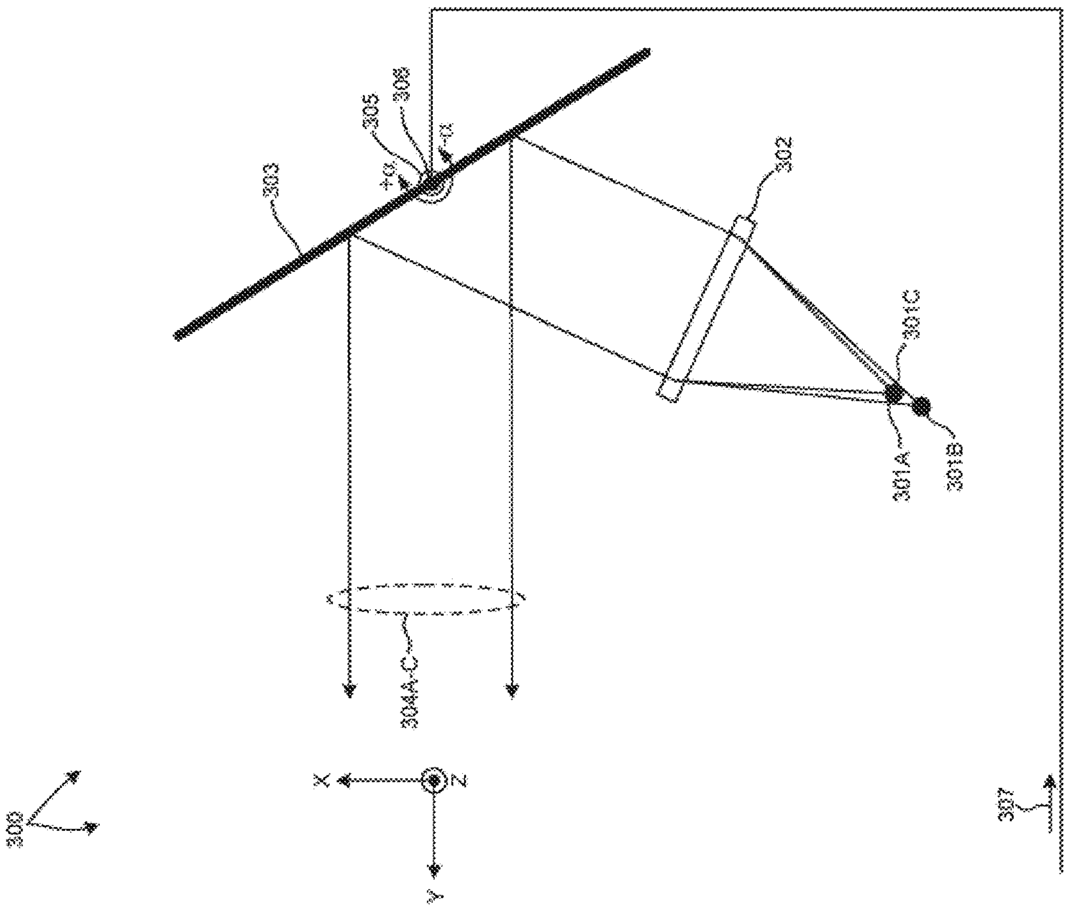
FIG. 5A depicts a 3-D LIDAR system 300 having a beam scanning device, according to some embodiments.

FIG. 5A depicts an embodiment 300 of a 3-D LIDAR system employing a beam scanning device. Embodiment 300 includes a set of light sources 301A-C, each associated with a different LIDAR measurement channel. In one example, at least some of the light sources 301A-C (e.g., all of the light sources 301A-C) are located in a one-dimensional array (i.e., located on a plane parallel to the z-direction; in and out of the drawing depicted in FIG. 5A). Light emitted from each light source 301A-C is divergent. These divergent beams pass through beam shaping optics 302 (e.g., collimating optics) where the emitted light is collimated. Thus, typically, the resulting beams remain slightly divergent or convergent after passing through beam shaping optics 302. After passing through beam shaping optics 302, each beam reflects from the surface of scanning mirror 303. The reflected beams 304A-C fan out in the y-z plane (i.e., in and out of the drawing depicted in FIG. 5A). Scanning mirror 303 rotates (e.g., in an oscillatory manner) (e.g., within a range of angles between +α and −α) about an axis 305 aligned with the surface of scanning mirror 303 and oriented in the z-direction as depicted in FIG. 5A. Scanning mirror 303 is rotated (e.g., in an oscillatory manner) about axis 305 by actuator 306 in accordance with command signals 307 received from a controller (e.g., master controller 190). As depicted in FIG. 5A, the reflected beams 304A-C are associated with light sources 301A-C. Scanning mirror 303 is oriented such that reflected beams 304A-C do not intersect with collimating optics 302, light sources 301A-C, or any other elements of the illumination and detection systems of the 3-D LIDAR system. Furthermore, reflected beams 304A-C maintain their separate trajectories in the z-direction. In this manner, the objects in the environment are interrogated by different beams of illumination light at different locations in the z-direction. In some embodiments, the reflected beams fan out over a range of angles that is less than 40 degrees measured in the y-z plane.

Scanning mirror 303 causes beams 304A-C to sweep in the x-direction. In some embodiments, the reflected beams scan over a range of angles that is less than 120 degrees measured in the x-y plane.

In the embodiment depicted in FIG. 5A, each light source of the array of light sources 301A-C may be located in a single plane. In the embodiment depicted in FIG. 5A, axis 305 of scanning mirror 303 lies in the plane including light sources 301A-C. However, in general, the array of light sources may be arranged in any suitable 2-D or 3-D configuration.

Figure 5B:
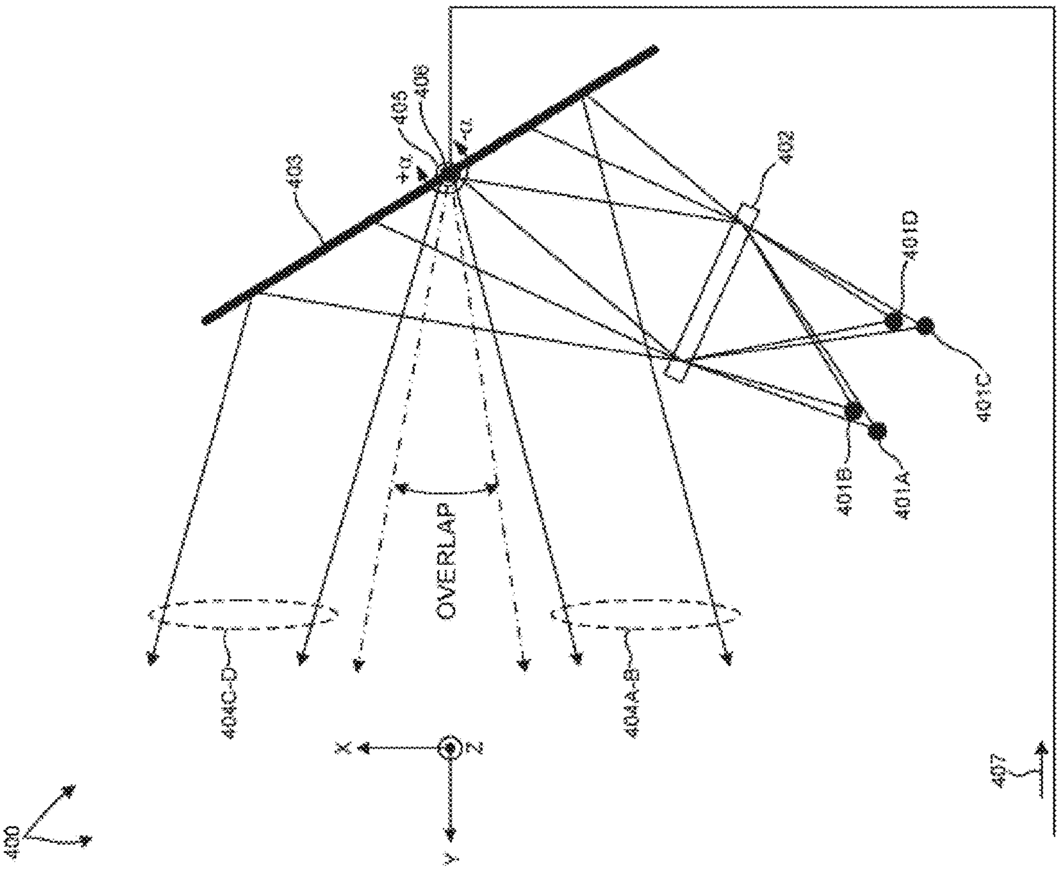
FIG. 5B depicts a 3-D LIDAR system 400 having a beam scanning device, according to some embodiments.

FIG. 5B depicts another embodiment 400 of a 3-D LIDAR system. Embodiment 400 includes a 2-D array of light sources 401A-D, each associated with a different LIDAR measurement channel. Light sources 401A-B are located in a plane (i.e., located on a plane parallel to the z-direction) and light sources 401C-D are located in another plane parallel to the z-direction. In addition, light sources 401A and 401C are located in a plane parallel to the xy plane and light sources 401B and 401D are located in the same plane as light sources 401A and 401C or in another plane parallel to the xy plane. Light emitted from each light source 401A-D is divergent. These divergent beams pass through beam shaping optics 402 where they are collimated. After passing through beam shaping optics 402, each beam reflects from the surface of scanning mirror 403. The reflected beams 404A-B and reflected beams 404C-D fan out in the y-z plane (i.e., in and out of the drawing depicted in FIG. 5B). Scanning mirror 403 rotates (e.g., in an oscillatory manner) (e.g., within a range of angles between +α and −α) about an axis 405 aligned with the surface of scanning mirror 403 and oriented in the z-direction as depicted in FIG. 5B. Scanning mirror 403 is rotated (e.g., in an oscillatory manner) about axis 405 by actuator 406 in accordance with command signals 407 received from a controller (e.g., master controller 190). As depicted in FIG. 5B, the reflected beams 404A-D are associated with light sources 401A-D. Scanning mirror 403 is oriented such that reflected beams 404A-D do not intersect with collimating optics 402, light sources 401A-D, or any other elements of the illumination and detection systems of the 3-D LIDAR system. Furthermore, reflected beams 404A-D maintain their separate trajectories in the z-direction and the x-direction. In this manner, the objects in the environment are interrogated by different beams of illumination light at different locations in the x- and z-directions. In some embodiments, the reflected beams fan out over a range of angles that is less than 40 degrees measured in the y-z plane.

Scanning mirror 403 causes beams 404A-D to sweep in the x-direction. In some embodiments, the reflected beams scan over a range of angles that is less than 120 degrees measured in the x-y plane. In some embodiments, the range of scanning angles is configured such that a portion of the environment interrogated by reflected beams 404A and 404B is also interrogated by reflected beams 404C and 404D, respectively. This is depicted by the angular "overlap" range depicted in FIG. 5B. In this manner, the spatial sampling resolution in this portion of the environment is effectively increased because this portion of the environment is being sampled by two different beams at different times.

In another further aspect, the scanning angle approximately tracks a sinusoidal function. As such, the dwell time near the middle of the scan is significantly less than the dwell time near the end of the scan. In this manner, the spatial sampling resolution of the 3-D LIDAR system is higher at the ends of the scan.

In the embodiment 400 depicted in FIG. 5B, four light sources are arranged in a 2×2 array. However, in general, any number of light sources may be arranged in any suitable manner. In one example, the 2×2 array is tilted with respect to the scanning mirror such that the measurement beams are interlaced in the overlap region.

In another aspect, the light source and detector of each LIDAR measurement channel is moved in two dimensions relative to the beam shaping optics employed to collimate light emitted from the light source. The 2-D motion is aligned with the optical plane of the beam shaping optic and effectively expands the field of view and increases the sampling density within the field of view of the 3-D LIDAR system.

Figure 6:
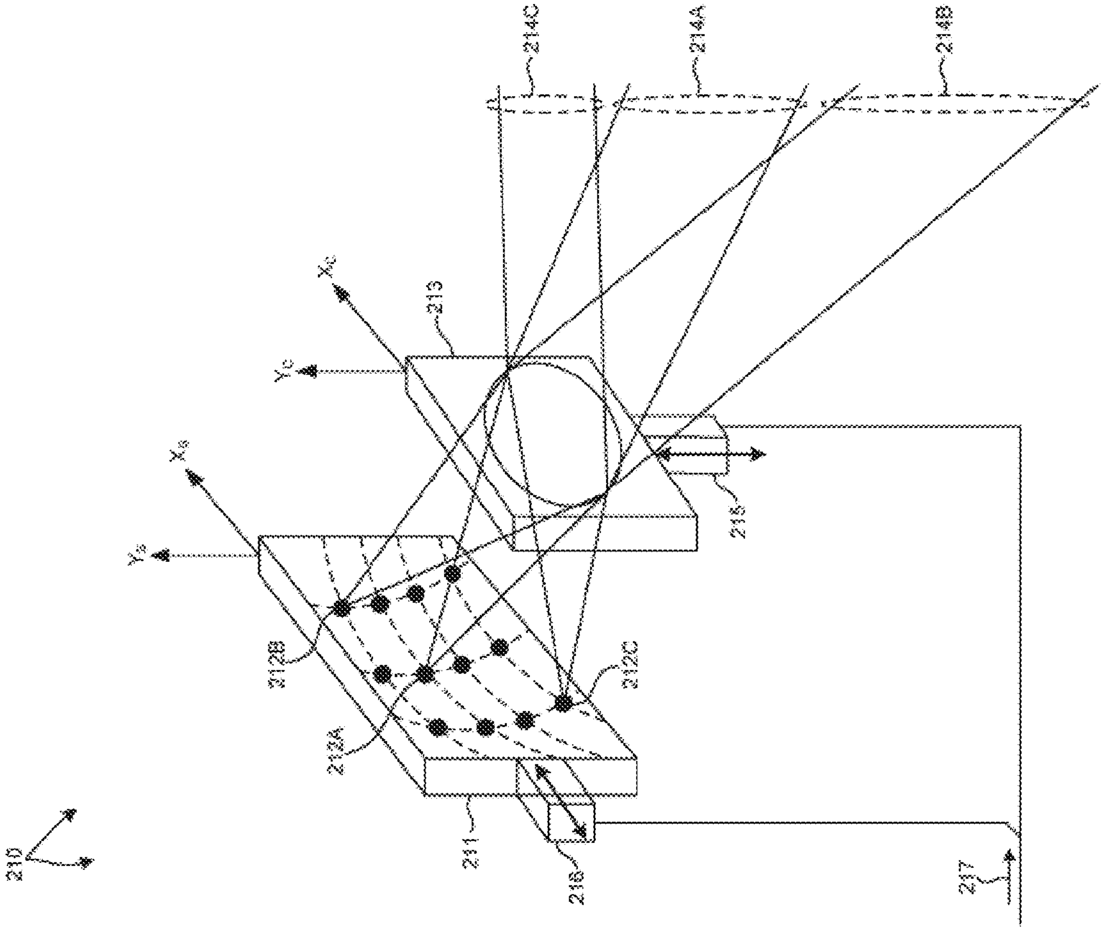
FIG. 6 depicts a 3-D LIDAR system 210 having a 2-D array of light sources 211, according to some embodiments.

FIG. 6 depicts an embodiment 210 of a 3-D LIDAR system employing a 2-D array of light sources 211, including light sources 212A-C. Each of light sources 212A-C is associated with a different LIDAR measurement channel. Light emitted from each light source 212A-C is divergent. These divergent beams pass through beam shaping optics 213 where they are collimated. Thus, typically, the resulting beams remain slightly divergent or convergent after passing through beam shaping optics 213. Collimated beams 214A-C are associated with light sources 212A-C, respectively. The collimated beams 214A-C pass on to the 3-D environment generate measurements.

In the depicted embodiment, the 2-D array of light sources 211 is moved in one direction (e.g., the $X_S$ direction) by actuator 216, and the beam shaping optics 213 are moved in an orthogonal direction (e.g., the $Y_C$ direction) by actuator 215. The relative motion in orthogonal directions between the 2-D array of light sources 211 and the beam shaping optics 213 effectively scans the collimated beams 214A-C over the 3-D environment to be measured. This scanning technique effectively expands the field of view and increases the sampling density within the field of view of the 3-D LIDAR system. The 2-D array of light sources 211 is translated (e.g., in an oscillatory manner) parallel to the $X_S$ axis by actuator 216 and the beam shaping optic 213 is translated (e.g., in an oscillatory manner) parallel to the $Y_C$ axis in accordance with command signals 217 received from a controller (e.g., master controller 190).

In the embodiment depicted in FIG. 6, the $X_C$-$Y_C$ plane is parallel to the $X_S$-$Y_S$ plane. As depicted in FIG. 6, the source and detector of each LIDAR measurement channel is moved in two dimensions relative to the beam shaping optics employed to collimate light emitted from the light source. The motion of both the 2-D array of light sources 211 and the beam shaping optics 213 is aligned with the optical plane of the collimating optic (i.e., $X_C$-$Y_C$ plane). In general, the same effect may be achieved by moving the array of light sources 211 in both the $X_S$ and $Y_S$ directions, while keeping collimating optics 213 stationary. Similarly, the same effect may be achieved by moving the beam shaping optics 213 in both the $X_C$ and $Y_C$ directions, while keeping the array of light sources 211 stationary.

In general, the rotations of scanning mirrors 203, 303, 403, and the displacements of the array of light sources 211 and the beam shaping optics 213, may be realized by any suitable drive system. In one example, flexure mechanisms harmonically driven by electrostatic actuators may be employed to exploit resonant behavior. In another example, an eccentric, rotary mechanism may be employed to transform a rotary motion generated by a rotational actuator into a 2-D planar motion. In general, the motion may be generated by any suitable actuator system (e.g., an electromagnetic actuator, a piezo actuator, etc.). In general, the motion may be sinusoidal, pseudorandom, or track any other suitable function.

Figure 7:
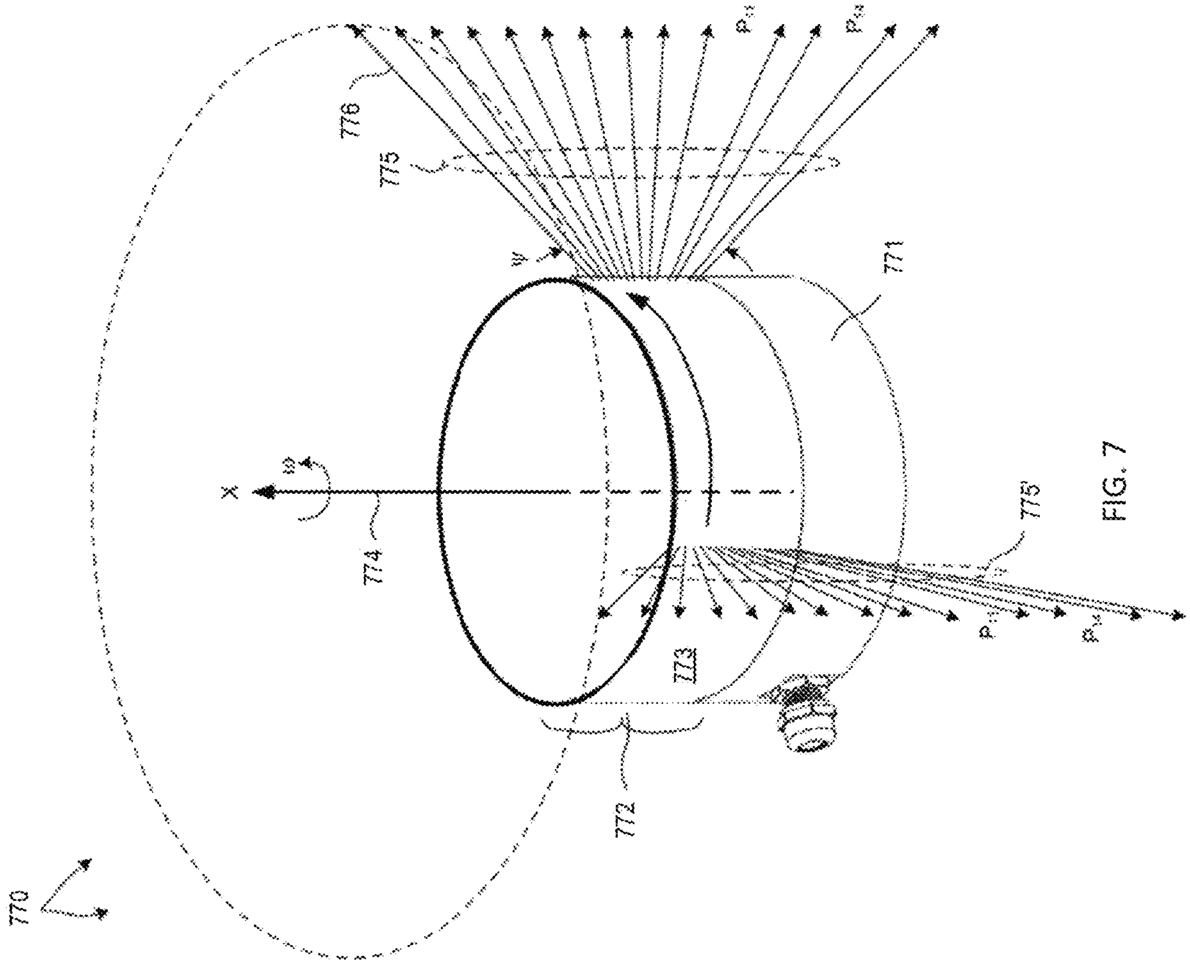
FIG. 7 depicts a three-dimensional ("3D") LIDAR system, in accordance with some embodiments.

FIG. 7 depicts a 3D LIDAR system 770, according to some embodiments. In the example of FIG. 7, the 3D LIDAR system 770 includes a lower housing 771 and an upper housing 772. The upper housing 772 includes a cylindrical shell element 773 constructed from a material that is transparent to infrared light (e.g., light having a wavelength within the spectral range of 700 to 1,700 nanometers). In one example, the cylindrical shell element 773 is transparent to light having wavelengths centered at 905 nanometers.

In some embodiments, the 3D LiDAR system 770 includes a LIDAR channel operable to emit laser beams 776 through the cylindrical shell element 773 of the upper housing 772. In the example of FIG. 7, each individual arrow in the sets of arrows 775, 775' directed outward from the 3D LIDAR system 770 represents a laser beam 776 emitted by the 3D LIDAR system. Each beam of light emitted from the system 770 may diverge slightly, such that each beam of emitted light forms a cone of illumination light emitted from system 770. In one example, a beam of light emitted from the system 770 illuminates a spot size of 20 centimeters in diameter at a distance of 100 meters from the system 770.

In some embodiments, a light source of a channel emits each laser beam 776 transmitted by the 3D LIDAR system 770. The direction of each emitted beam may be determined by the angular orientation ω of the channel's light source with respect to the system's central axis 774 and by the angular orientation ψ of the light source with respect to a second axis orthogonal to the system's central axis. For example, the direction of an emitted beam in a horizontal dimension may be determined by the light source's angular orientation ω, and the direction of the emitted beam in a vertical dimension may be determined by the light source's angular orientation ψ. Alternatively, the direction of an emitted beam in a vertical dimension may be determined the light source's angular orientation ω, and the direction of the emitted beam in a horizontal dimension may be determined by the light source's angular orientation ψ. (For purposes of illustration, the beams of light 775 are illustrated in one angular orientation relative to a non-rotating coordinate frame of the 3D LIDAR system 770 and the beams of light 775' are illustrated in another angular orientation relative to the non-rotating coordinate frame.)

The 3D LIDAR system 770 may scan a particular point (e.g., pixel) in its field of view by adjusting the orientation ω of a light source to the desired scan point (ω, ψ) and emitting a laser beam from the light source. Likewise, the 3D LIDAR system 770 may systematically scan its field of view by adjusting the orientations ω of the light sources to a set of scan points ($\omega_i$, $\psi_j$) and emitting laser beams from the light sources at each of the respective scan points.

In some embodiments, the LIDAR system 770 may also include one or more optical scanning devices configured to oscillate about the second axis, thereby allowing the LIDAR system 770 to control the angular orientation ψ of the emitted beams, as described in further detail below.

Some Embodiments of Improved Oscillatory Scanning Techniques

While the positions of the light sources and/or the beam shaping optics can be moved to increase the sampling density within the field of view of the LIDAR system, the channels of the LIDAR system remain under-utilized relative to the firing capabilities of the light source(s). In some examples, the maximum firing rate of the illumination source 162 corresponds to the operational range of the LIDAR system 100 (e.g., 500 KHz for a 300 m range). However, the firing rate of the illumination source 162 is often limited by the rotation rate of the beam scanning device 164 (or the LIDAR system 100). Being that the illumination source 162 relies on the rotation of the beam scanning device 164 (or the LIDAR system 100) for unique measurement positions, the illumination source 162 may operate with a reduced firing rate. For example, to avoid redundant (or repeated) measurements, the illumination source 162 may operate with a firing rate of less than 50 KHz when the rotation rate of the beam scanning device 164 (or the LIDAR system 100) is 10-20 KHz. As such, it may be advantageous to leverage the firing capabilities of the illumination source 162 to improve the utilization of each channel and increase the sampling density (or resolution) of the LIDAR system 100.

Accordingly, an improved LIDAR system is described herein. In at least one embodiment, the LIDAR system includes a scanning mirror configured to oscillate at high speeds in a direction (e.g., rotational direction) orthogonal to the scan direction. In some examples, the oscillation of the scanning mirror enables the laser source to operate at higher firing rates to improve the utilization of each channel. In certain examples, the resolution of the LIDAR system can be improved (or maintained) while reducing system size and cost.

Figure 8A:
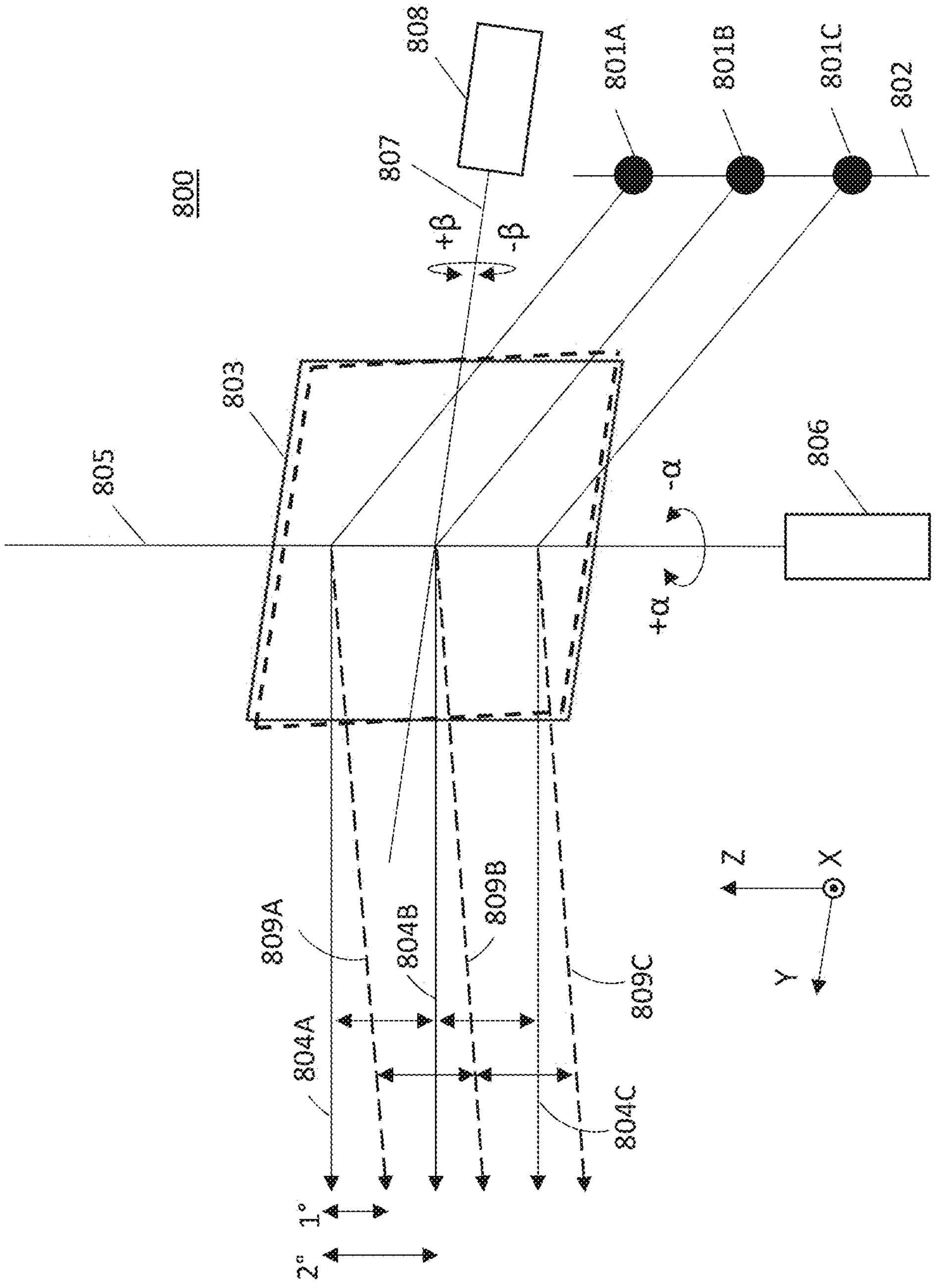
FIG. 8A depicts a LIDAR system in accordance with some embodiments.

FIG. 8A depicts an embodiment of a 3-D LIDAR system 800 in accordance with aspects described herein. In one example, the LIDAR system 800 corresponds to a LIDAR device. The LIDAR system 800 includes one or more light sources 801A-C, each associated with a different LIDAR measurement channel. Any suitable number of light sources may be used (e.g., 1-128 light sources or more). In some embodiments, some or all of the light sources 801A-C may be arranged in an array (e.g., a 1-D array), and each light source in the array may be configured to emit a beam of light onto the surface of a scanning mirror 803. In some embodiments, the light sources 801A-C of the array may be aligned along an axis 802 that is parallel to an axis of rotation 805 of the scanning mirror 803. In the example of FIG. 8A, the scanning mirror 803 is configured to rotate (e.g., within a range of angles between $-\alpha$ and $+\alpha$) about an axis 805 aligned with the surface of scanning mirror 803 and oriented in the z-direction, and the light sources 801A-C are aligned along an axis 802 that is also oriented in the z-direction. Although FIG. 8A depicts a single scanning mirror 803 and a single array of light sources 801A-C, some embodiments of the LIDAR system 800 may include multiple scanning mirrors, each of which may correspond to a respective light source or array of light sources.

Still referring to FIG. 8A, the beams emitted by the light sources 801A-C reflect from the surface of the scanning mirror 803. The reflected beams 804A-C fan out in the y-z plane. The scanning mirror 803 may be rotated (e.g., in an oscillatory manner) about axis 805 by a scanning mechanism 806 in accordance with command signals received from a controller (e.g., master controller 190). In one example, the scanning mechanism 806 includes at least one actuator. As depicted in FIG. 8A, the reflected beams 804A-C are associated, respectively, with light sources 801A-C. The scanning mirror 803 may be oriented such that reflected beams 804A-C do not intersect with the light sources 801A-C or any other elements of the illumination and detection systems of the 3-D LIDAR system. Furthermore, reflected beams 804A-C maintain their separate trajectories in the z-direction. In this manner, the objects in the environment are interrogated by different beams of illumination light at different locations in the z-direction. One or more of the beams 804A-C may be reflected back toward the scanning mirror 803 by various objects in the environment, and the scan mirror 803 may redirect those return beams to the optical detectors of the LIDAR system 800 (not shown in FIG. 8A).

The field of view (FOV) of the LIDAR system 800 in the z-direction ($Z_{FOV}$) at the system's nominal maximum range (R) may depend on various factors, including the span of the array of light sources (e.g., the distance between the outermost light sources in the array) and the angles of incidence between the beams of light emitted by the light sources 801A-C and the surface of the scanning mirror 803 (measured in the z-direction). For example, the light sources 801A-C may be arranged such that the system's $Z_{FOV}$ is approximately 30 degrees. Using conventional scanning techniques, and assuming that the light sources 801A-C are uniformly spaced along the array's axis 802, the scan resolution of the LIDAR system 800 in the z-direction ($Z_{RES}$) at the system's nominal maximum range (R) may be given by the expression $Z_{RES}=Z_{FOV}/(\text{num\_LS}-1)$, where num_LS is the number of light sources in the array. For example, if $Z_{FOV}$ is 30 degrees and the array includes 16 uniformly spaced light sources, $Z_{RES}$=30 degrees/(16−1)=2 degrees. Thus, using conventional scanning techniques, the system's scan resolution in the z-direction may be increased by increasing the number of light sources in the array, i.e., by increasing the number of physical channels in the system.

In some embodiments, in addition to the scanning mechanism 806, which is configured to rotate the scanning mirror 803 about the first scanning axis 805, the LIDAR system 800 may include an actuator 808 configured to rotate the scanning mirror 803 about a second scanning axis 807. The second scanning axis 807 may be aligned with the surface of the scanning mirror 803 and oriented in a direction orthogonal to both the first scanning axis 805 and the axis 802 of the light sources 801A-801C (e.g., the y-direction). In the example of FIG. 8A, the actuator 808 is configured to rotate (e.g., oscillate) the scanning mirror 803 about the second scanning axis 807 within a range of angles between $-\beta$ and $+\beta$.

Each of the scanning mechanism 806 and the actuator 808 may be implemented using any suitable drive system. In one example, a pancake motor may be used. In one example, flexure mechanisms harmonically driven by electrostatic actuators may be used to exploit resonant behavior. In another example, an eccentric, rotary mechanism may be used to transform a rotary motion generated by a rotational actuator into a 2-D planar motion. In general, the motion may be generated by any suitable actuator system (e.g., an electromagnetic actuator, a piezo actuator, etc.). In general, the motion may be sinusoidal, pseudorandom, or track any other suitable function.

In some embodiments, the oscillation of the scanning mirror 803 about the second scanning axis 807 changes the angle of incidence between the light beams emitted by the light sources 801A-C and the surface of the scanning mirror 803 (measured with respect to the first scanning axis 805) and, therefore, changes the trajectories of the beams 809A-C reflected from the surface of the scanning mirror 803 in the z-direction. Thus, by oscillating the scanning mirror 803 about the second scanning axis 807, the LIDAR system 800 can provide supplemental infill beams in the z-direction as the beams reflected by the scanning mirror scan across the y-z plane. For example, oscillation of the scanning mirror 803 about the second scanning axis 807 enables the light sources 801A-C to provide infill beams 809A-C in addition to reflected beams 804A-C, as illustrated in FIG. 8A. In this way, each channel of the LIDAR system 800 may provide scanning functionality similar to multiple (e.g., two or more) different channels in a conventional LIDAR system.

Referring again to the above-described example in which the application of conventional scanning techniques to an array of 16 uniformly spaced light sources 801 yields a 30 degree field of view in the z-direction ($Z_{FOV}$) and a 2 degree scan resolution in the z-direction ($Z_{RES}$) at the system's nominal maximum range (R), one of ordinary skill in the art will appreciate that the use of the second scanning axis 807 can provide the LIDAR system 800 with improved scan resolution in the z-direction $Z_{RES}'$ without requiring an increased number of light sources in the array 801. For example, if the magnitude of the maximum angle of oscillation $\beta$ of the scanning mirror about the second scanning axis 807 is 1 degree ($\beta=Z_{RES}/2$), and the LIDAR system 800 can trigger each light source to fire F times while the scanning mirror moves from scanning angle y=0 degrees to scanning angle y=$\beta$ degrees, then the system's improved scan resolution $Z_{RES}'$ is approximately $Z_{RES}/2F$.

Figure 8B:
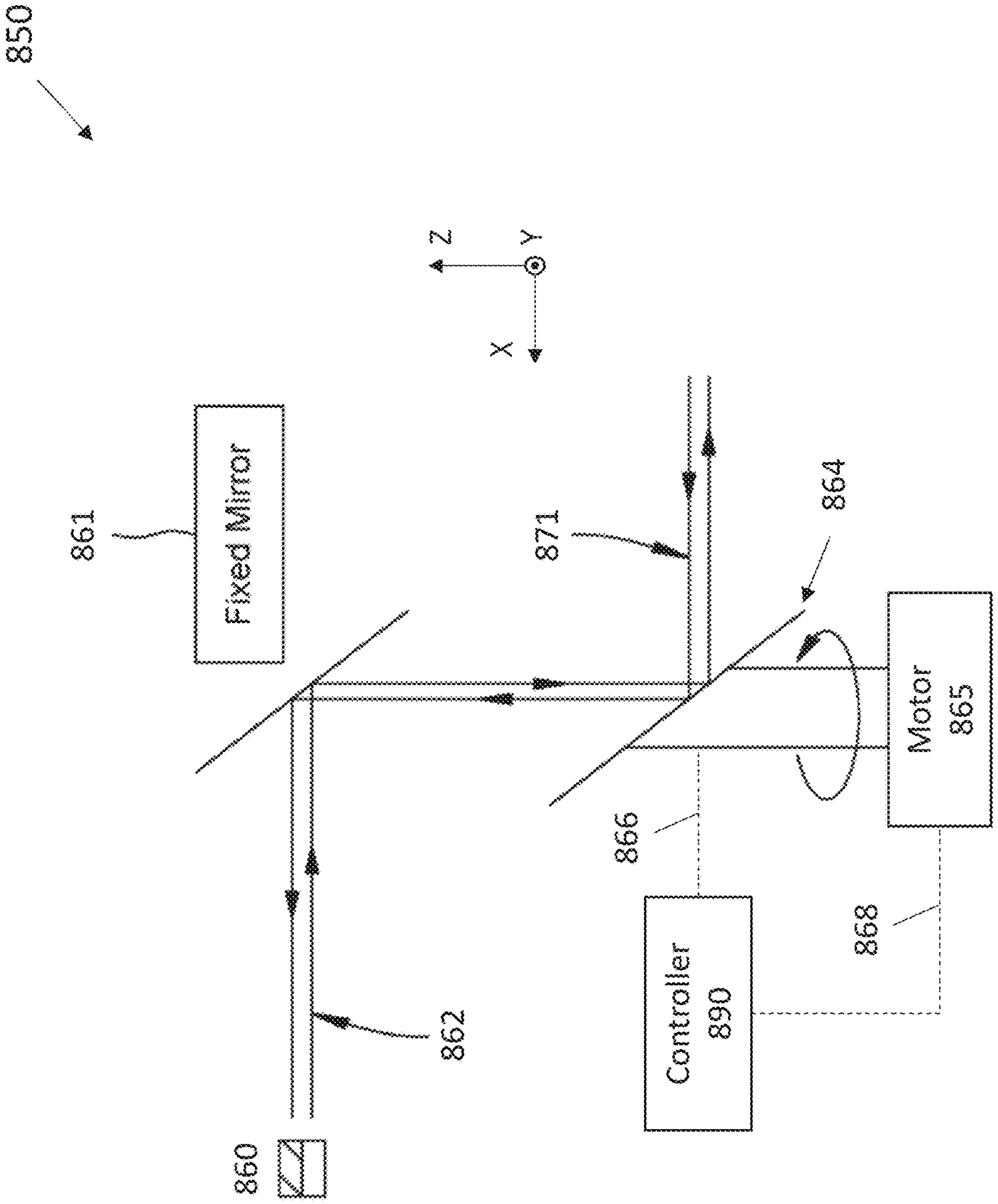
FIG. 8B depicts a LIDAR system in accordance with some embodiments.

FIG. 8B is a block diagram of a LIDAR system 850 in accordance with some embodiments. In one example, the LIDAR system 850 corresponds to a LIDAR device. In some examples, the LIDAR system 850 corresponds to a single LIDAR channel of a multi-channel LIDAR system. The LIDAR system 850 includes laser electronics 860, a fixed mirror 861, a scanning mirror 864, a motor assembly (or scanning mechanism) 865, and a controller 890. In some embodiments, the fixed mirror 861 is omitted and the laser electronics 860 are positioned such that there is direct line of sight between the scanning mirror 864 and the laser electronics, and/or the laser electronics 860 are in optical communication with the scanning mirror 864 via one or more optical waveguides. In one example, the laser electronics 860 correspond to the illumination driver integrated circuit (IC) 152, the illumination source 162 (e.g., laser source), and the photodetector 170 of the LIDAR system 100 of FIG. 1. In some examples, the controller 890 may correspond to (or be included) in the master controller 190. Likewise, the fixed mirror 861 may correspond to the mirror element 161 of the LIDAR system 100; however, in some examples, the fixed mirror 861 is optional.

In one example, the scanning mirror 864 is configured as a "wobbulator" (e.g., similar to the scanning mirror 803 of FIG. 8A). As such, the scanning mirror 864 is configured to oscillate (or wobbulate) about an axis (e.g., the y-axis in FIG. 8B) in response to command signals 866 received from the controller 890. In some examples, the command signals 866 correspond to AC or DC control voltages (e.g., 150 Volts DC). In addition, the scanning mirror 864 may be rotated (e.g., within a range of angles) about an axis (e.g., the z-axis in FIG. 8B) by the motor assembly 865 in accordance with command signals 868 received from the controller 890. In one example, the motor assembly 865 includes a pancake motor. In certain examples, the scanning mirror 864 is configured to be rotated similar to the scanning mirrors 203, 303, 403, 803 of FIGS. 5A-8A. The scanning mirror 864 may oscillate in a direction orthogonal to the rotation direction. In some examples, the axis about which the scanning mirror 864 oscillates may be orthogonal to the axis about which the scanning mirror 864 rotates. For example, if the rotation of the scanning mirror 864 causes transmitted beam(s) 862 to sweep the field of view in the y-z plane, the scanning mirror 864 may be configured to oscillate about the y-axis (which extends in and out of the plane of the drawing depicted in FIG. 8B) to provide infill beams in the z-direction.

As described above, the scanning mirror 864 can be rotated about a first axis (e.g., the z-axis of FIG. 8B) and oscillated about a second axis (e.g., the y-axis of FIG. 8B). However, in other examples, the axis about which the scanning mirror 864 rotates may be the same axis that the scanning mirror 864 oscillates along. For example, the scanning mirror 864 can be rotated about and oscillated along the z-axis of FIG. 8B. In such examples, the scanning mirror 864 may be configured with curved (e.g., concave) or angled surface. By oscillating the scanning mirror 864, the transmitted beam(s) 862 can reflect off different curvatures of the scanning mirror 864 (e.g., with different angles of incidence) to provide infill beams in the z-direction. In other examples, the scanning mirror 864 can be positioned such that the transmitted beam(s) 862 reflect off the scanning mirror 864 at a fixed angle of incidence (e.g., 45 degrees). The scanning mirror 864 can be physically displaced via oscillation (e.g., along the z-axis of FIG. 8B) to provide infill beams in the z-direction. It should be appreciated that similar techniques and configurations may be applied to the scanning mirror 803 of the LIDAR system 800 of FIG. 8A.

While the examples above include rotating and oscillating scanning mirrors, in other examples, different optical scanning devices can be rotated and/or oscillated (i.e., wobbulated). For example, a scanning lens (e.g., beam shaping optics 213 of FIG. 7) may be rotated about and oscillated along the same axis (e.g., the $Y_C$ axis of FIG. 7). In some examples, the beam shaping optics 213 can be oscillated to provide supplemental infill beams, similar to the scan pattern shown in FIG. 8A.

Returning to FIG. 8B, the scanning mirror 864 can be oscillated to provide unique positions for LIDAR measurements to be collected within a single collection window. For example, the oscillation of the scanning mirror 864 and the emission of the beams 862 may yield a sinusoidal pattern of scan points in the x-y plane, providing a plurality of unique measurement positions. In this context, "collection window" corresponds to a period of time where a measurement is collected at each rotational position of the scanning mirror 864 (i.e., rotational positions actuated by the motor assembly 865). In previous systems (e.g., with non-oscillating scanning mirrors), the laser source may be fired once during each collection window, since multiple firings would produce redundant measurements from the same scanning mirror position. However, given that the scanning mirror 864 is oscillated (or wobbulated), the laser source of system 850 can be fired multiple times during a single collection window to produce multiple unique measurements. In some examples, the oscillation of the scanning mirror 864 enables the channel utilization of the system 850 to be increased (i.e., reduced idle time). As such, the sampling density of the LIDAR system 850 may be increased. For example, if the laser source is fired 10 times during a single collection window to collect 10 unique measurement points, a single channel of the LIDAR system 850 may provide the same (or substantially similar) functionality as 10 different conventional channels. In certain examples, the increased channel functionality may be leveraged to reduce the physical channel count of LIDAR systems.

Figure 9:
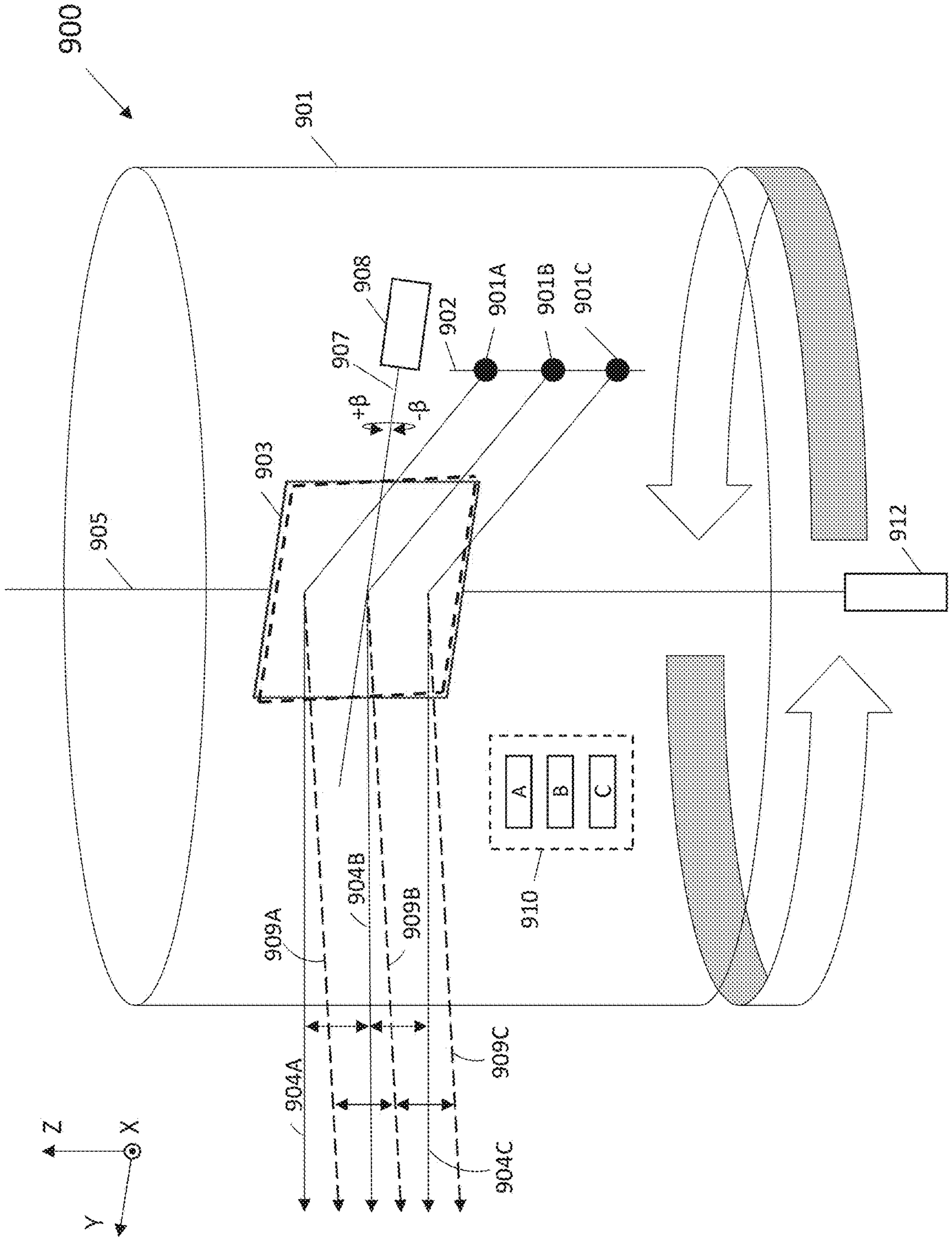
FIG. 9 depicts a LIDAR system in accordance with some embodiments.

FIG. 9 depicts another embodiment of a 3-D LIDAR system 900 in accordance with aspects described herein. The LIDAR system 900 may correspond to a LIDAR device. In one example, the LIDAR system 900 is a rotational LIDAR system similar to the LIDAR system 770 of FIG. 7. The LIDAR system 900 includes a housing 901. In some examples, the housing 901 includes a lower housing and an upper housing. The housing 901 may include a cylindrical shell element constructed from a material that is transparent to infrared light (e.g., light having a wavelength within the spectral range of 700 to 1,700 nanometers).

The LIDAR system 900 includes one or more light sources 901A-C, each associated with a different LIDAR measurement channel. Any suitable number of light sources may be used (e.g., 1-128 light sources or more). In some embodiments, some or all of the light sources 901A-C may be arranged in one or more arrays (e.g., 1-D arrays), and each light source in an array may be configured to emit a beam of light onto the surface of a scanning mirror 903. In some embodiments, the light sources 901A-C of the array may be aligned along an axis 902 that is parallel to an axis of rotation 905 of the housing 901. In other examples, the light sources 901A-C may be arranged differently (e.g., aligned along a different axis). The LIDAR system 900 includes a plurality of optical detectors 910. In one example, the plurality of optical detectors 910 are photodetectors. In some examples, each optical detector of the plurality of optical detectors 910 corresponds to a channel of the LIDAR system 900 (e.g., a first channel associated with light source 901A, a second channel associated with light source 901B, etc.). The plurality of optical detectors 910 are configured to receive (or detect) light reflected from the environment that is redirected by the scanning mirror 903. As shown, the light sources 901A-C, the scanning mirror 903, and the plurality of optical detectors 910 are included within the housing 901. In some embodiments, the optical detectors 910 may be co-located with the light sources 901. In some embodiments, the optical detectors 910, the light sources 901, and the scanning mirror 903 may be mechanically coupled to a common frame and/or may be components of a common mechanical structure (or assembly) within the housing.

In the example of FIG. 9, the housing 901 (and/or the components within the housing) may be configured to rotate (e.g., 360 degrees) about the axis 905 oriented in the z-direction. In one example, the light sources 901A-C, the scanning mirror 903, and the plurality of optical detectors 910 are configured to rotate with the housing 901. In some examples, the light sources 901A-C, the scanning mirror 903, and the plurality of optical detectors 910 are rotated about the axis 905 at the same rotation rate (e.g., the rotation rate of the housing 901). Although FIG. 9 depicts a single scanning mirror 903 and a single array of light sources 901A-C, some embodiments of the LIDAR system 900 may include multiple scanning mirrors, each of which may correspond to a respective light source or array of light sources (and a respective optical detector or array of optical detectors).

Still referring to FIG. 9, the beams emitted by the light sources 901A-C reflect from the surface of the scanning mirror 903. The reflected beams 904A-C fan out in the y-z plane. The housing (and/or the components within the housing) 901 may be rotated about axis 905 by a scanning mechanism 912 in accordance with command signals received from a controller (e.g., master controller 190). In one example, the scanning mechanism 912 includes at least one actuator. As depicted in FIG. 9, the reflected beams 904A-C are associated, respectively, with light sources 901A-C. The scanning mirror 903 may be oriented such that reflected beams 904A-C do not intersect with the light sources 901A-C or any other elements of the illumination and detection systems of the 3-D LIDAR system. Furthermore, reflected beams 904A-C maintain their separate trajectories in the z-direction. In this manner, the objects in the environment are interrogated by different beams of illumination light at different locations in the z-direction. One or more of the beams 904A-C may be reflected back toward the scanning mirror 903 by various objects in the environment, and the scan mirror 903 may redirect those return beams to the optical detectors 910 of the LIDAR system 900 (reflection beams not shown in FIG. 9).

The field of view (FOV) of the LIDAR system 900 in the z-direction ($Z_{FOV}$) at the system's nominal maximum range (R) may depend on various factors, including the span of the array of light sources (e.g., the distance between the outermost light sources in the array) and the angles of incidence between the beams of light emitted by the light sources 901A-C and the surface of the scanning mirror 903 (measured in the z-direction). For example, the light sources 901A-C may be arranged such that the system's $Z_{FOV}$ is approximately 30 degrees. Using conventional scanning techniques, and assuming that the light sources 901A-C are uniformly spaced along the array's axis 902, the scan resolution of the LIDAR system 900 in the z-direction ($Z_{RES}$) at the system's nominal maximum range (R) may be given by the expression $Z_{RES}=Z_{FOV}/(\text{num\_LS}-1)$, where num_LS is the number of light sources in the array. For example, if $Z_{FOV}$ is 30 degrees and the array includes 16 uniformly spaced light sources, $Z_{RES}$=30 degrees/(16−1)=2 degrees. Thus, using conventional scanning techniques, the system's scan resolution in the z-direction may be increased by increasing the number of light sources in the array, i.e., by increasing the number of physical channels in the system.

In some embodiments, in addition to the scanning mechanism 912, which is configured to rotate the housing 901 (including the light sources 901A-C, the scanning mirror 903, and the plurality of optical detectors 910) about the first scanning axis 905, the LIDAR system 900 may include an actuator 908 configured to rotate (e.g., oscillate) the scanning mirror 903 about a second scanning axis 907. The second scanning axis 907 may be aligned with the surface of the scanning mirror 903 and oriented in a direction orthogonal to the first scanning axis 905 (e.g., the y-direction). In some examples, the second scanning axis 907 may be orthogonal to the axis 902 of the light sources 901A-901C. In the example of FIG. 9, the actuator 908 is configured to rotate (e.g., oscillate) the scanning mirror 903 about the second scanning axis 907 within a range of angles between −β and +β.

Each of the scanning mechanism 912 and the actuator 908 may be implemented using any suitable drive system. In one example, a pancake motor may be used. In one example, flexure mechanisms harmonically driven by electrostatic actuators may be used to exploit resonant behavior. In another example, an eccentric, rotary mechanism may be used to transform a rotary motion generated by a rotational actuator into a 2-D planar motion. In general, the motion may be generated by any suitable actuator system (e.g., an electromagnetic actuator, a piezo actuator, etc.). In general, the motion may be sinusoidal, pseudorandom, or track any other suitable function.

In some embodiments, the oscillation of the scanning mirror 903 about the second scanning axis 907 changes the angle of incidence between the light beams emitted by the light sources 901A-C and the surface of the scanning mirror 903 (measured with respect to the first scanning axis 905) and, therefore, changes the trajectories of the beams 909A-C reflected from the surface of the scanning mirror 903 in the z-direction. Thus, by oscillating the scanning mirror 903 about the second scanning axis 907, the LIDAR system 900 can provide supplemental infill beams in the z-direction as the beams reflected by the scanning mirror scan across the y-z plane. For example, oscillation of the scanning mirror 903 about the second scanning axis 907 enables the light sources 901A-C to provide infill beams 909A-C in addition to reflected beams 904A-C, as illustrated in FIG. 9. In this way, each channel of the LIDAR system 900 may provide scanning functionality similar to multiple (e.g., two or more) different channels in a conventional LIDAR system.

Referring again to the above-described example in which the application of conventional scanning techniques to an array of 16 uniformly spaced light sources 901 yields a 30 degree field of view in the z-direction ($Z_{FOV}$) and a 2 degree scan resolution in the z-direction ($Z_{RES}$) at the system's nominal maximum range (R), one of ordinary skill in the art will appreciate that the use of the second scanning axis 907 can provide the LIDAR system 900 with improved scan resolution in the z-direction $Z_{RES}'$ without requiring an increased number of light sources in the array 901. For example, if the magnitude of the maximum angle of oscillation β of the scanning mirror about the second scanning axis 907 is 1 degree ($\beta=Z_{RES}/2$), and the LIDAR system 900 can trigger each light source to fire F times while the scanning mirror moves from scanning angle y=0 degrees to scanning angle y=β degrees, then the system's improved scan resolution $Z_{RES}'$ is approximately $Z_{RES}/2F$.

As described above, different scanning mirror configurations can be included in LIDAR systems. For example, the scanning mirror may be a single-axis scanning mirror configured to rotate (e.g., oscillate) independently about a single axis (e.g., scanning mirror 903 of LIDAR system 900). Likewise, the scanning mirror may be a dual-axis scanning mirror configured to rotate (e.g., oscillate) about two different axes independently (e.g., scanning mirror 803 of LIDAR system 800).

Figure 10:
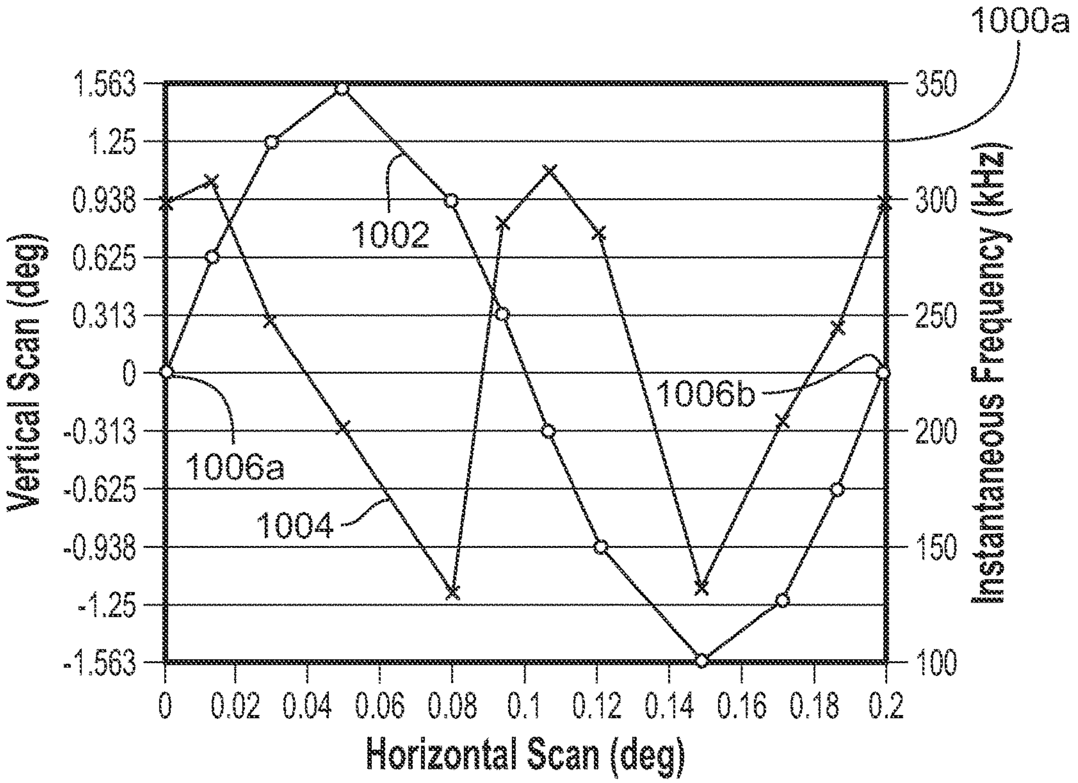
FIG. 10 depicts a set of graphs corresponding to the operation of a LIDAR system in accordance with some embodiments.
Figure 10:
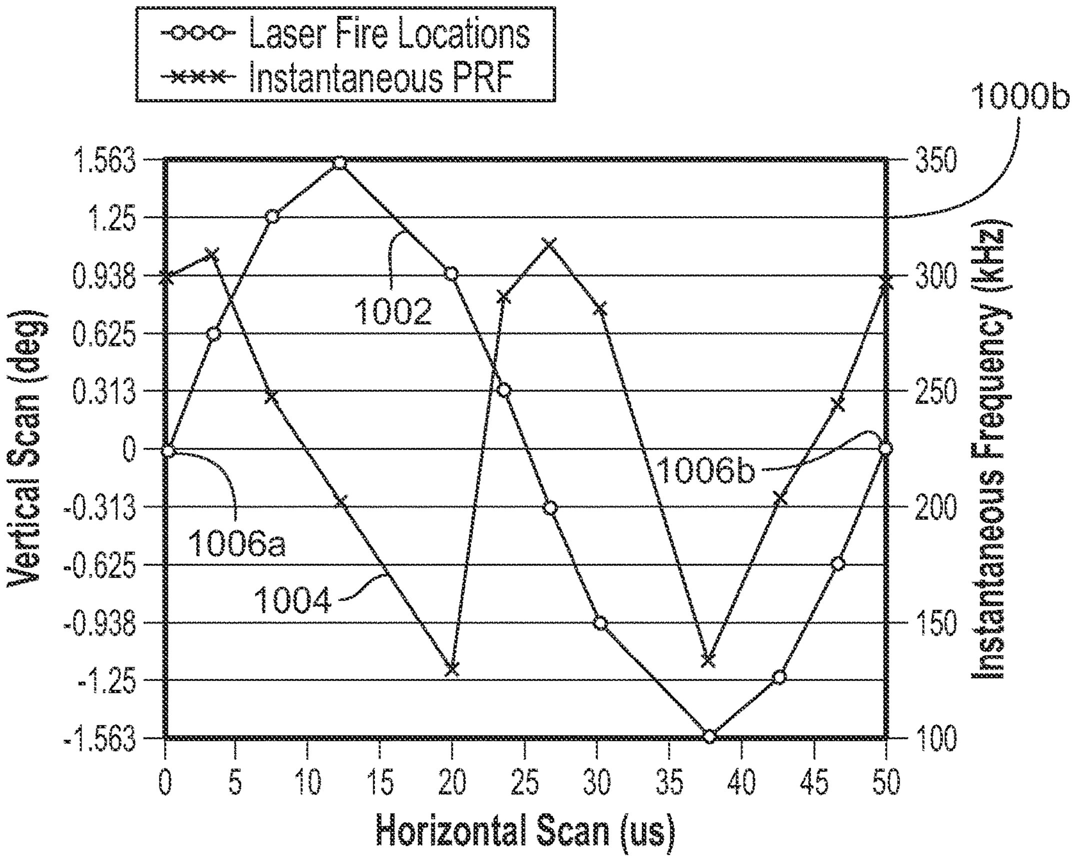

FIG. 10 illustrates a set of graphs representing an example firing pattern of the LIDAR system 850 of FIG. 8B in accordance with some embodiments. It should be appreciated that the set of graphs in FIG. 10 may also represent example firing patterns of LIDAR systems 800, 900 of FIGS. 8A, 9. In one example, a first graph 1000*a* depicts the firing pattern of the system 850 over a scan range (degrees) and a second graph 1000*b* depicts the firing pattern of the system 850 over a scan period (μs) corresponding to the scan range. In each graph, a first trace 1002 represents the oscillation pattern of the scanning mirror 864 over one cycle (i.e., one collection window) and a second trace 1004 represents the instantaneous pulse repetition frequency (PRF) of the firing pattern. It should be appreciated that the trace 1002 may also represent example firing patterns of LIDAR systems 800, 900 of FIGS. 8A, 9.

In one example, the x-axis of each graph 1000*a*, 1000*b* corresponds to the scan (e.g., horizontal scan) provided by the scanning mirror 864 (via the motor assembly 865). Likewise, the y-axis of the graphs 1000*a*, 1000*b* corresponds to the scan (e.g., vertical scan) provided by the scanning mirror 864 (via oscillation/wobbulation). As shown, the oscillation pattern (trace 1002) is a sinusoidal pattern. In some examples, the oscillation pattern is configured such that one cycle (or period) is completed between central fires 1006*a*, 1006*b*. The angular spacing or time difference between central fires 1006*a*, 1006*b* may be selected to provide a baseline resolution for the LIDAR system 850 (e.g., 0.2 deg).

As described above, the laser source can be fired multiple times during a single collection window (i.e., between central fires 1006*a*, 1006*b*) to produce multiple unique measurements. In one example, each central fire corresponds to a main beam (e.g., beams 804A-C) and the additional fires correspond to supplemental infill beams (e.g., beams 809A-C). As shown, the trace 1002 includes dots indicating the different firing locations. For example, the laser source is fired 10 additional times between the central fires 1006*a*, 1006*b*. In some examples, the laser source is fired with a non-linear pattern. In other words, the time interval between each laser firing is varied such that the laser is fired in unique positions with respect to the vertical scan range. As such, the instantaneous PRF (trace 1004) may vary over the horizontal scan range of one cycle. In some examples, the PRF can vary by almost 200 KHz during one cycle (as indicated by trace 1004). In some examples, the timing of the laser's firing may be controlled such that the vertical spacing between scan points is uniform (e.g., the vertical positions of the scan points are aligned to uniformly-spaced horizontal lines of a grid).

In one example, the oscillation (or wobbulation) rate of the scanning mirror 864 corresponds to the resolution of the LIDAR system 850 and the rotation rate of the scanning mirror 864 (or the LIDAR system 850). The oscillation rate of the scanning mirror 864 may be configured as any frequency below a maximum oscillation frequency where performance becomes degraded. For example, if the angular slew of the scanning mirror 864 is too fast, the detector of laser electronics 860 may be out of position to received return beam(s) 871 reflected by the target. In one example, the scanning mirror (803, 864, 903) is oscillated with an oscillation rate between approximately 18 kHz and approximately 22 kHz. In some examples, the maximum oscillation frequency corresponds to a target overlap ratio of the transmit mirror spot to the return mirror spot. In this context, the transmit mirror spot corresponds to the location on the scanning mirror 864 where the transmit beam 862 is reflected and the return mirror spot corresponds to the location on the scanning mirror 864 where the return beam 871 is expected (or projected) to be reflected based on the operational range of the LIDAR system 850.

In some examples, oscillation rates (or frequencies) for the scanning mirror 864 may be determined for multiple rotation rates of the scanning mirror 864 (or the LIDAR system 850). For example, multiple rotation rates are shown in equations (1) for a target resolution of the LIDAR system 850 shown in equation (2):

$$r\_rate_1 = 25 \text{ Hz} \tag{1a}$$

$$r\_rate_2 = 20 \text{ Hz} \tag{1b}$$

$$r\_rate_3 = 10 \text{ Hz} \tag{1c}$$

$$target\_res = 0.2 \text{ deg} \tag{2}$$

where, $r\_rate_1$ corresponds to a first rotation rate, $r\_rate_2$ corresponds to a second rotation rate, and $r\_rate_3$ corresponds to a third rotation rate. Likewise, target_res corresponds to a pre-determined target resolution rate of the LIDAR system 850. In some examples, the target resolution rate is determined based on a specific LIDAR application (e.g., type of environment, type of device, etc.).

As described above, the baseline firing rate of the laser source corresponds to the rotation rate of the scanning mirror 864 (or the LIDAR system 100). The baseline firing rate represents the maximum firing rate of the laser source without the oscillation provided the scanning mirror 864. As such, the baseline firing rate may correspond to measurements collected from the center of the scanning mirror 864 (i.e., central fires). In one example, the baseline firing rate of the laser source can be represented by equation (3) below:

$$fire\_rate_b = \frac{r\_rate \cdot 2\pi}{target\_res} = \begin{bmatrix} 45 \\ 16 \\ 18 \end{bmatrix} \text{KHz} \tag{3}$$

where, $fire\_rate_b$ corresponds to the baseline firing rates of each rotation rate. For example, a first firing rate of 45 KHz corresponds to the first rotation rate $r\_rate_1$, a second firing rate of 36 KHz corresponds to the second rotation rate $r\_rate_2$, and a third rotation rate of 18 KHz corresponds to the third rotation rate $r\_rate_3$.

In one example, the amount of time the scanning mirror 864 has to complete one cycle (i.e., one period of the sinusoidal pattern) corresponds to the baseline firing rate $fire\_rate_b$. Assuming the scanning mirror 864 is configured to complete one cycle between each central fire, the cycle time of the scanning mirror 864 can be represented by equation (4) below:

$$T_{cycle} = \frac{1}{fire\_rate_b} = \begin{bmatrix} 22.222 \\ 27.778 \\ 55.556 \end{bmatrix} \mu s \tag{4}$$

where, $T_{cycle}$ corresponds to the cycle time for one cycle of the scanning mirror 864. For example, a first cycle time of 22.222 μs corresponds to the first rotation $r\_rate_1$, a second cycle time of 27.778 μs corresponds to the second rotation $r\_rate_2$, and a third cycle time of 55.556 μs corresponds to the third rotation $r\_rate_3$.

In some examples, the oscillation rate of the scanning mirror 864 can be determined from the maximum cycle time $T_{cycle}$, as shown in equation (5) below:

$$F_{osc} = \frac{1}{T_{cycle}} = \begin{bmatrix} 45 \\ 36 \\ 18 \end{bmatrix} \text{KHz} \tag{5}$$

where, $F_{osc}$ corresponds to the oscillation rate (or frequency) of the scanning mirror 864. In other words, $F_{osc}$ represents the frequency of the sinusoidal oscillation pattern. In one example, given that the scanning mirror 864 is configured to complete one cycle between central fires, the oscillation rate may be substantially the same as the baseline firing rate $fire\_rate_b$. For example, a first oscillation rate of 45 KHz corresponds to the first rotation rate $r\_rate_1$, a second oscillation rate of 36 KHz corresponds to the second rotation rate $r\_rate_2$, and a third oscillation rate of 18 KHz corresponds to the third rotation rate $r\_rate_3$.

In one example, the optimized firing rate of the laser source is determined based on the number of additional measurement points per cycle of the scanning mirror 864. For example, if 10 additional measurement points are being collected per cycle, a wobbulation ratio of 11 may be used to calculate the optimized firing rate (1 central fire point+10 additional points). In some examples, the number of additional measurement points corresponds to the size of the swing (i.e., degrees of wobble) provided by the scanning mirror 864. Likewise, the number of additional measurement points may be proportional to the sampling density of the LIDAR system 850 (e.g., more points, higher resolution). In one example, the optimized firing rate accounting for the oscillation of the scanning mirror 864 is represented by equation (6) below:

$$fire\_rate_o = F_{osc} \cdot wob\_ratio = \begin{bmatrix} 495 \\ 396 \\ 198 \end{bmatrix} \text{KHz} \tag{6}$$

where, $fire\_rate_o$ corresponds to the optimized firing rate and wob_ratio corresponds to the wobbultion ratio described above. For example, assuming a wobbultion ratio of 11, a first optimized firing rate of 495 KHz corresponds to the first rotation rate $r\_rate_1$, a second optimized firing rate of 396 KHz corresponds to the second rotation rate $r\_rate_2$, and a third optimized firing rate of 198 KHz corresponds to the third rotation rate $r\_rate_3$. As shown in equation (6), the optimized firing rate scales with the wobbulation ratio. For example, as the wobbultion ratio increases (more points), the optimized firing rate increases. In some examples, the optimized firing rate may be restricted by one or more characteristics of the laser source (e.g., max firing rate).

As described above, the oscillation rate (or frequency) of the scanning mirror 864 may be limited to prevent undesired performance degradation. For example, if the angular slew of the scanning mirror 864 is too fast, the detector of laser electronics 860 may be out of position to receive return beam(s) 871 reflected by the target. As such, the maximum oscillation rate may be limited based on the parameters of the detector.

In one example, an oscillation (or wobbultion) limit can be determined based on the parameters of the detector. In some examples, multiple oscillation limits can be calculated for multiple detector configurations. For example, several detector diameters are shown in equation (7) below:

$$\Phi_{APD} = \begin{bmatrix} .23 \\ .5 \end{bmatrix} \text{mm} \tag{7}$$

where, $\Phi_{APD}$ is the diameter of the detector. As shown, the detector may have a first diameter of 0.23 mm or a second diameter of 0.5 mm. In other examples, the detector may have a different diameter. In some examples, the diameter of the detector corresponds to the upper limit of beam spot size. As used herein, "beam spot size" refers to the diameter of the emitted beam. The beam spot size depends on many factors, including the beam divergence, the distance the beam has traveled from the LIDAR device, etc. The upper limit of the beam spot size may be the diameter of the beam spot at the LIDAR device's maximum nominal range.

In some examples, the angle subtended by a detection spot corresponds to a ratio between the diameter of the detector and the focal length of a lens being used with the detector (e.g., beam shaping optical elements 163 of FIG. 1). As used herein, "detection spot" refers to a cross-section of the return beam at the plane in which the return beam interests the detector. In one example, the angle subtended by the detection spot can be represented by equation (8) below:

$$\alpha_{APD} = \frac{\Phi_{APD}}{FL} = \begin{bmatrix} .12 \\ .26 \end{bmatrix} deg \tag{8}$$

where, $\alpha_{APD}$ is the angle subtended by the detection spot and FL is an assumed focal length of the lens. In the example above, the focal length is assumed to be 110 mm.

Similarly, the angle subtended by the laser beam spot corresponds to a ratio of the maximum laser beam spot (i.e., transmit spot) and the focal length of the lens. In one example, the angle subtended by the laser beam spot can be represented by equation (9) below:

$$\alpha_{beam} = \frac{\Phi_{beam}}{FL} = 0.12\ deg \tag{9}$$

where, $\alpha_{beam}$ is the angle subtended by the laser beam spot and $\Phi_{beam}$ is the maximum laser beam spot (i.e., transmit spot). In the above example, the maximum laser beam spot is assumed to be 0.23 mm.

In some examples, if the detector is larger than the maximum laser beam spot $\Phi_{beam}$, a detector buffer can be introduced. For example, a detector buffer may be represented by equation (10) below:

$$detOversize = \frac{(\alpha_{APD} - \alpha_{beam})}{2} = \begin{bmatrix} 0 \\ 1.227 \times 10^{-3} \end{bmatrix} deg \tag{10}$$

where, detOversize is the detector buffer. In the above example, the first detector diameter of 0.23 mm is the same size as the maximum laser beam spot, and as such, has a detector buffer of 0 deg. Likewise, the second detector diameter of 0.5 mm is larger than the maximum laser beam spot and has a detector buffer of approximately $1.227 \times 10^{-3}$ deg.

In one example, the maximum allowed angular scan rate is determined based on the detector buffer, the angular substance of the detection spot, and the time of flight (TOF) corresponding to the maximum range of the system. For example, the maximum allowed angular scan rate may be represented by equation (11) below:

$$\delta = \frac{detOversize + \alpha_{APD} \cdot \xi}{TOF} = \begin{bmatrix} 1.567 \times 10^5 \\ 1.26 \times 10^6 \end{bmatrix} \frac{1}{s} \cdot m\text{rad} \tag{11}$$

where, δ is the maximum angular scan rate. For example a first angular scan rate of $1.567\times10^5$ (1/s)·mrad corresponds to the first diameter of 0.23 mm and a second angular scan rate of $1.26\times10^6$ (1/s)·mrad corresponds to the second diameter of 0.5 mm. As such, the larger detector diameter providing a detector buffer enables a faster maximum angular scan rate. In the above example, a TOF of 1.334 μs corresponding to a maximum range of 200 m is assumed.

In some examples, the maximum oscillation rate (i.e., the oscillation limit) is determined from the maximum angular scan rate and the angular distance the scanning mirror 864 travels in a full cycle (e.g., swing up, swing back). In one example, the maximum oscillation rate is determined using equation (12) below:

$$OscRate = \frac{\delta}{2 \cdot OscDist} = \begin{bmatrix} 2.873 \times 10^3 \\ 2.311 \times 10^4 \end{bmatrix} \text{Hz} \tag{12}$$

where, OscRate is the maximum oscillation rate and OscDist is the beam displacement during one cycle (i.e., distance traveled by the scanning mirror 864). In some examples, the beam displacement OscDist corresponds to the angular channel spacing of the system. In the above example, an OscDist or angular channel spacing of 1.563 deg is assumed. As shown, a first maximum oscillation rate of $2.873\times10^3$ Hz corresponds to the first diameter of 0.23 mm and a second maximum oscillation rate of $2.311\times10^4$ Hz corresponds to the second diameter of 0.5 mm. As such, the larger detector diameter enables a faster maximum oscillation rate (e.g., up to 23 KHz) compared to the maximum oscillation rate of the smaller detector (e.g., up to 2.8 KHz).

Figure 11:
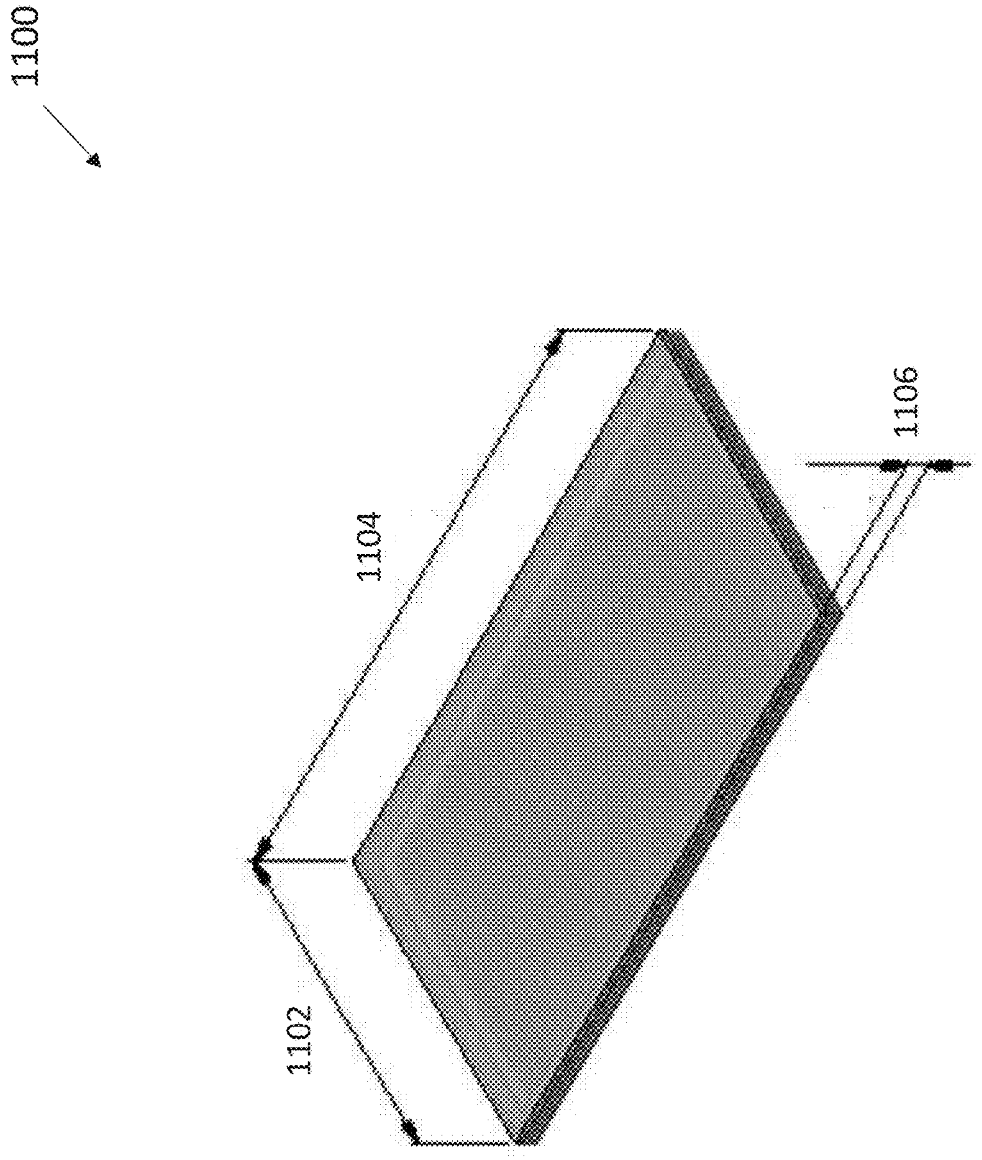
FIG. 11 depicts a scanning mirror assembly of a LIDAR system in accordance with some embodiments.

FIG. 11 illustrates a scanning mirror assembly 1100 in accordance with aspects described herein. In one example, the scanning mirror assembly 1100 includes the scanning mirror 864 of FIG. 8B. The scanning mirror assembly 1100 is configured as a 1-D dithering mirror that oscillates (or wobbulates) along an axis in response to command signals (or control voltages) applied to the scanning mirror assembly 1100. In certain examples, the rate (or frequency) of oscillation corresponds to the value of the control voltage applied to the scanning mirror assembly 1100; however, in other examples, the scanning mirror assembly 1100 may be configured to provide a fixed oscillation rate. In some examples, the control voltage(s) are applied to one or more paddles included in the scanning mirror assembly 1100. In some examples, the scanning mirror assembly 1100 is configured to provide a minimum swing (e.g., 1.8 deg). The scanning mirror assembly 1100 can be configured with a high fill factor (e.g., above 90%). In one example, the scanning mirror assembly 1100 is configured as a micro-electromechanical system (MEMS) device. As shown, the scanning mirror assembly 1100 has a width 1102, a length 1104, and a height 1106. In one example, the width 1102 is 24 mm, the length 1104 is 45.2 mm, and the height 1106 is 1.6 mm.

In some examples, multiple instances of the LIDAR system 850 may be included in a common system (e.g., LIDAR system 100). In such examples, the oscillation of each scanning mirror 864 may be controlled to keep the mirrors in-phase with one another (i.e., in-synchrony). In certain examples, pulse encoding or wavelength-division multiplexing (MDM) can be used to mitigate cross-talk introduced by the oscillation of the scanning mirror(s) 864.

As described above, the oscillation of the scanning mirror 864 enables the channel utilization of the system 850 to be increased (i.e., reduced idle time). As such, a single channel of the LIDAR system 850 may provide the same functionality as multiple channels and the sampling density of the LIDAR system may be increased. For example, a LIDAR array having 16 physical channels may be configured with the LIDAR system 850 to function as a 176 channel device. In addition, the increased channel functionality may be leveraged to reduce the physical channel count of LIDAR systems.

Some Additional Examples of LIDAR Systems

Figure 12:
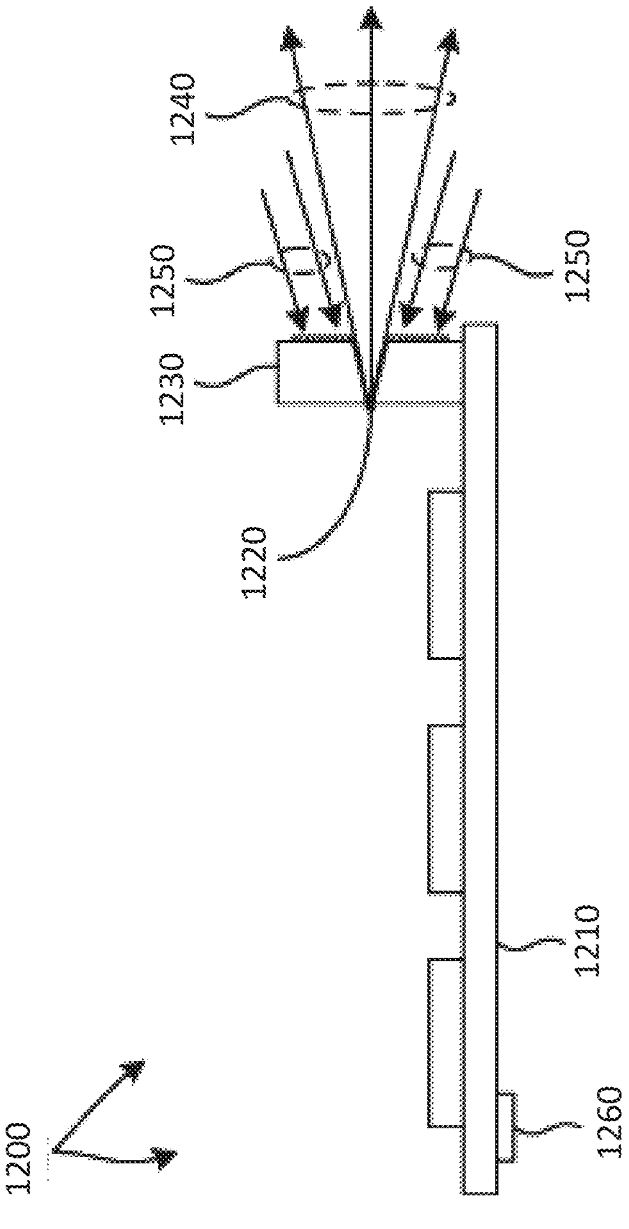
FIG. 12 depicts an integrated LIDAR measurement device in accordance with some embodiments.

FIG. 12 depicts an integrated LIDAR measurement device 1200 in another embodiment. Integrated LIDAR measurement device 1200 includes a pulsed light emitting device 1220, a light detecting element 1230, associated control and signal conditioning electronics integrated onto a common substrate 1210 (e.g., electrical board), and connector 1260. Pulsed emitting device 1220 generates pulses of illumination light 1240 and detector 1230 detects collected light 1250. Integrated LIDAR measurement device 1200 generates digital signals indicative of the distance between the 3-D LIDAR system and an object in the surrounding environment based on a time of flight of light emitted from the integrated LIDAR measurement device 1200 and detected by the integrated LIDAR measurement device 1200. Integrated LIDAR measurement device 1200 is electrically coupled to the 3-D LIDAR system via connector 1260. Integrated LIDAR measurement device 1200 receives control signals from the 3-D LIDAR system and communicates measurement results to the 3-D LIDAR system over connector 1260.

Figure 13:
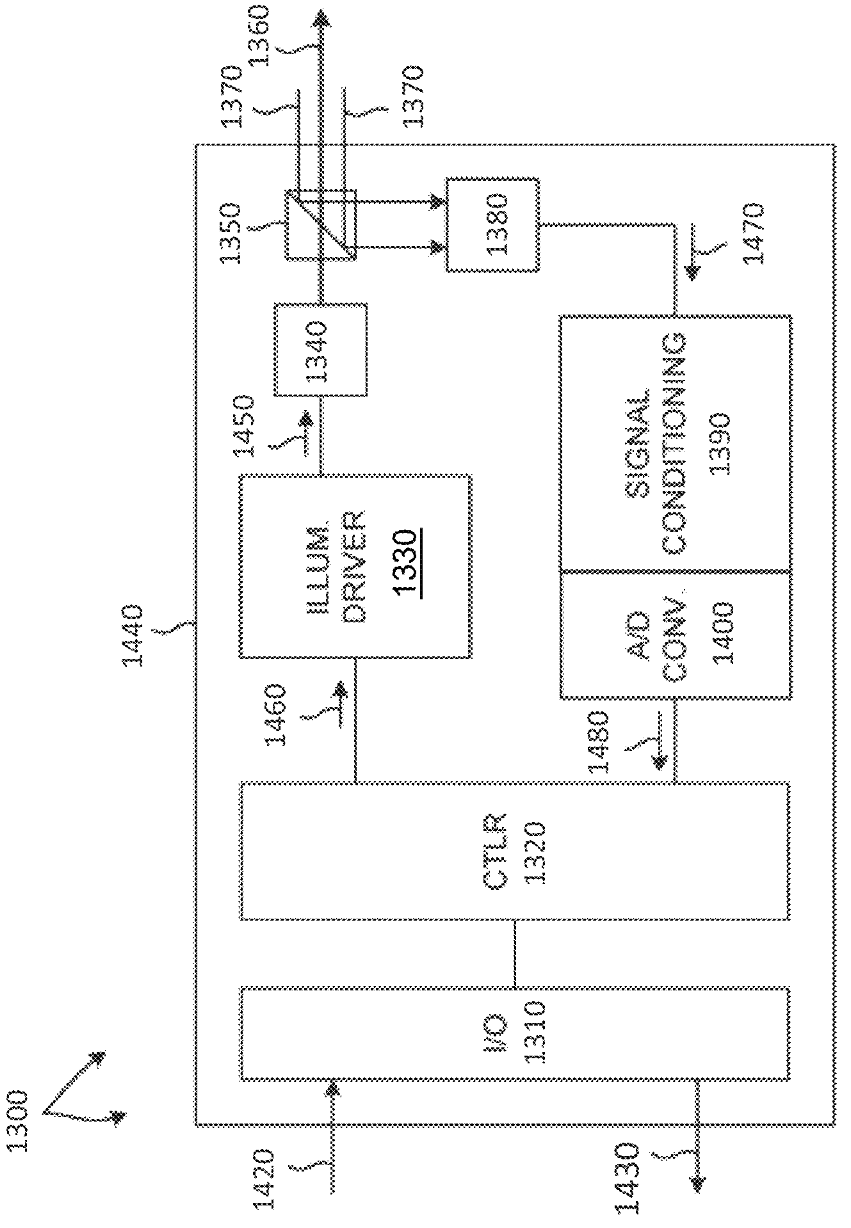
FIG. 13 depicts a schematic view of an integrated LIDAR measurement device in accordance with some embodiments.

FIG. 13 depicts a schematic view of an integrated LIDAR measurement device 1300 in another embodiment. Integrated LIDAR measurement device 1300 includes a pulsed light emitting device 1340, a light detecting element 1380, a beam splitter 1350 (e.g., polarizing beam splitter, regular beam splitter, etc.), an illumination driver 1330, signal conditioning electronics 1390, analog to digital (A/D) conversion electronics 1400, controller 1320, and digital input/output (I/O) electronics 1310 integrated onto a common substrate 1440.

As depicted in FIG. 13, a measurement begins with a pulse firing signal 1460 generated by controller 1320. In some examples, a pulse index signal is determined by controller 1320 that is shifted from the pulse firing signal 1460 by a time delay, $T_D$. The time delay includes the known delays associated with emitting light from the LIDAR system (e.g., signal communication delays and latency associated with the switching elements, energy storage elements, and pulsed light emitting device) and known delays associated with collecting light and generating signals indicative of the collected light (e.g., amplifier latency, analog-digital conversion delay, etc.).

Illumination driver 1330 generates a pulse electrical current signal 1450 in response to pulse firing signal 1460. Pulsed light emitting device 1340 generates pulsed light emission 1360 in response to pulsed electrical current signal 1450. The illumination light 1360 is focused and projected onto a particular location in the surrounding environment by one or more optical elements of the LIDAR system (not shown).

In some embodiments, the pulsed light emitting device is laser based (e.g., laser diode). In some embodiments, the pulsed illumination sources are based on one or more light emitting diodes. In general, any suitable pulsed illumination source may be contemplated.

As depicted in FIG. 13, return light 1370 reflected from the surrounding environment is detected by light detector 1380. In some embodiments, light detector 1380 is an avalanche photodiode. Light detector 1380 generates an output signal 1470 that is amplified by signal conditioning electronics 1390. In some embodiments, signal conditioning electronics 1390 includes an analog trans-impedance amplifier. However, in general, the amplification of output signal 1470 may include multiple, amplifier stages. In this sense, an analog trans-impedance amplifier is provided by way of non-limiting example, as many other analog signal amplification schemes may be contemplated within the scope of this patent document.

The amplified signal is communicated to A/D converter 1400. The digital signals are communicated to controller 1320. Controller 1320 generates an enable/disable signal employed to control the timing of data acquisition by ADC 1400 in concert with pulse firing signal 1460.

As depicted in FIG. 13, the illumination light 1360 emitted from integrated LIDAR measurement device 1300 and the return light 1370 directed toward integrated LIDAR measurement device share a common path. In the embodiment depicted in FIG. 13, the return light 1370 is separated from the illumination light 1360 by a polarizing beam splitter (PBS) 1350. PBS 1350 could also be a non-polarizing beam splitter, but this generally would result in an additional loss of light. In this embodiment, the light emitted from pulsed light emitting device 1340 is polarized such that the illumination light passes through PBS 1350. However, return light 1370 generally includes a mix of polarizations. Thus, PBS 1350 directs a portion of the return light toward detector 1380 and a portion of the return light toward pulsed light emitting device 1340. In some embodiments, it is desirable to include a quarter waveplate after PBS 1350. This is advantageous in situations when the polarization of the return light is not significantly changed by its interaction with the environment. Without the quarter waveplate, the majority of the return light would pass through PBS 1350 and be directed toward the pulsed light emitting device 1340, which is undesirable. However, with the quarter waveplate, the majority of the return light will pass through PBS 1350 and be directed toward detector 1380.

In general, a multiple pixel 3-D LIDAR system includes a plurality of LIDAR measurement channels. In some embodiments, a multiple pixel 3-D LIDAR system includes a plurality of integrated LIDAR measurement devices each emitting a pulsed beam of illumination light from the LIDAR device into the surrounding environment and measuring return light reflected from objects in the surrounding environment.

In some embodiments, digital I/O 1310, timing logic 1320, A/D conversion electronics 1400, and signal conditioning electronics 1390 are integrated onto a single, silicon-based microelectronic chip. In another embodiment these same elements are integrated into a single gallium-nitride or silicon based circuit that also includes the illumination driver. In some embodiments, the A/D conversion electronics and controller 1320 are combined as a time-to-digital converter.

In some embodiments, the time of flight signal analysis is performed by controller 1320, entirely. In these embodiments, signals 1430 communicated from integrated LIDAR measurement device 1300 include an indication of the distances determined by controller 1320. In some embodiments, signals 1430 include the digital signals 1480 generated by A/D converter 1400. These raw measurement signals are processed further by one or more processors located on board the 3-D LIDAR system, or external to the 3-D LIDAR system to arrive at a measurement of distance. In some embodiments, controller 1320 performs preliminary signal processing steps on signals 1480 and signals 1430 include processed data that is further processed by one or more processors located on board the 3-D LIDAR system, or external to the 3-D LIDAR system to arrive at a measurement of distance.

In some embodiments a 3-D LIDAR system includes multiple integrated LIDAR measurement devices. In some embodiments, a delay time is set between the firing of each integrated LIDAR measurement device. Signal 1420 includes an indication of the delay time associated with the firing of integrated LIDAR measurement device 1300. In some examples, the delay time is greater than the time of flight of the measurement pulse sequence to and from an object located at the maximum range of the LIDAR device. In this manner, there is no cross-talk among any of the integrated LIDAR measurement devices. In some other examples, a measurement pulse is emitted from one integrated LIDAR measurement device before a measurement pulse emitted from another integrated LIDAR measurement device has had time to return to the LIDAR device. In these embodiments, care is taken to ensure that there is sufficient spatial separation between the areas of the surrounding environment interrogated by each beam to avoid cross-talk.

Figure 14A:
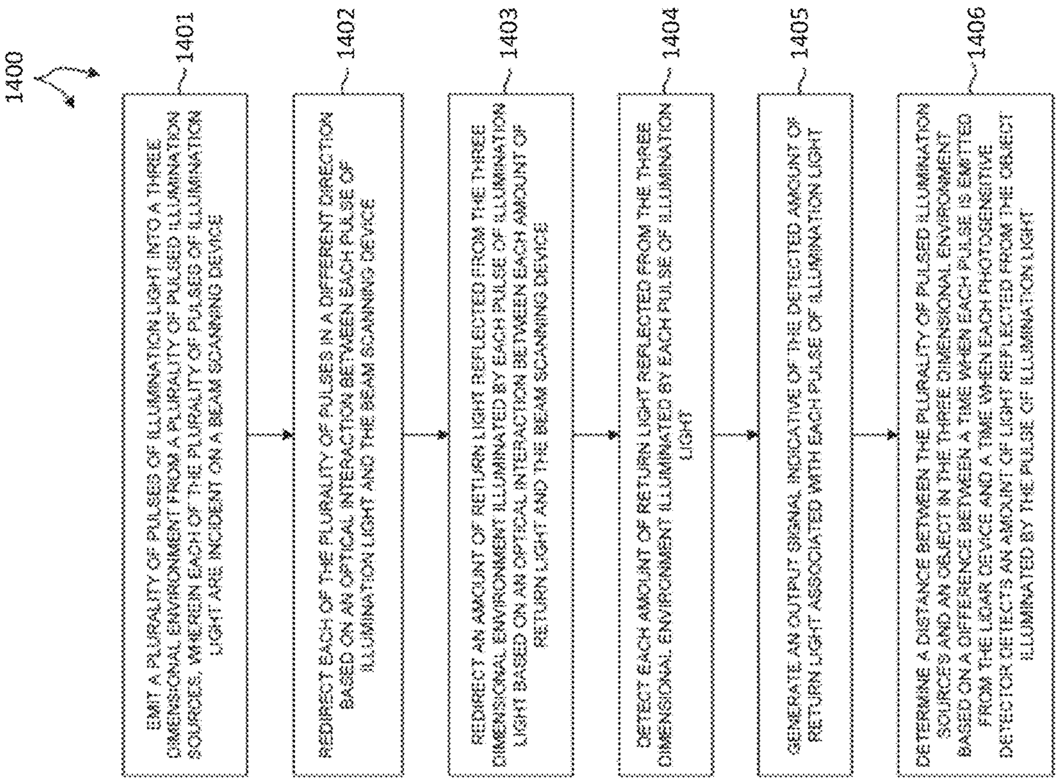
FIG. 14A depicts a flowchart illustrative of a method of performing multiple LIDAR measurements based on scanning measurement beams in accordance with some embodiments.

FIG. 14A illustrates a flowchart of a method 1400 suitable for implementation by a LIDAR system as described herein. In some embodiments, LIDAR system 100 is operable in accordance with method 1400 illustrated in FIG. 14A. However, in general, the execution of method 1400 is not limited to the embodiments of LIDAR system 100 described with reference to FIG. 1. These illustrations and corresponding explanation are provided by way of example as many other embodiments and operational examples may be contemplated.

In block 1401, a plurality of pulses of illumination light are emitted into a 3-D environment from a plurality of pulsed illumination sources. Each of the plurality of pulses of illumination light are incident on a beam scanning device.

In block 1402, each of the plurality of pulses is redirected in a different direction based on an optical interaction between each pulse of illumination light and the beam scanning device.

In block 1403, an amount of return light reflected from the 3-D environment illuminated by each pulse of illumination light is redirected based on an optical interaction between each amount of return light and the beam scanning device.

In block 1404, each amount of return light reflected from the 3-D environment illuminated by each pulse of illumination light is detected (e.g., by a photosensitive detector).

In block 1405, an output signal indicative of the detected amount of return light associated with each pulse of illumination light is generated.

In block 1406, a distance between the plurality of pulsed illumination sources and an object in the 3-D environment is determined based on a difference between a time when each pulse is emitted from the LIDAR device and a time when each photosensitive detector detects an amount of light reflected from the object illuminated by the pulse of illumination light.

Figure 14B:
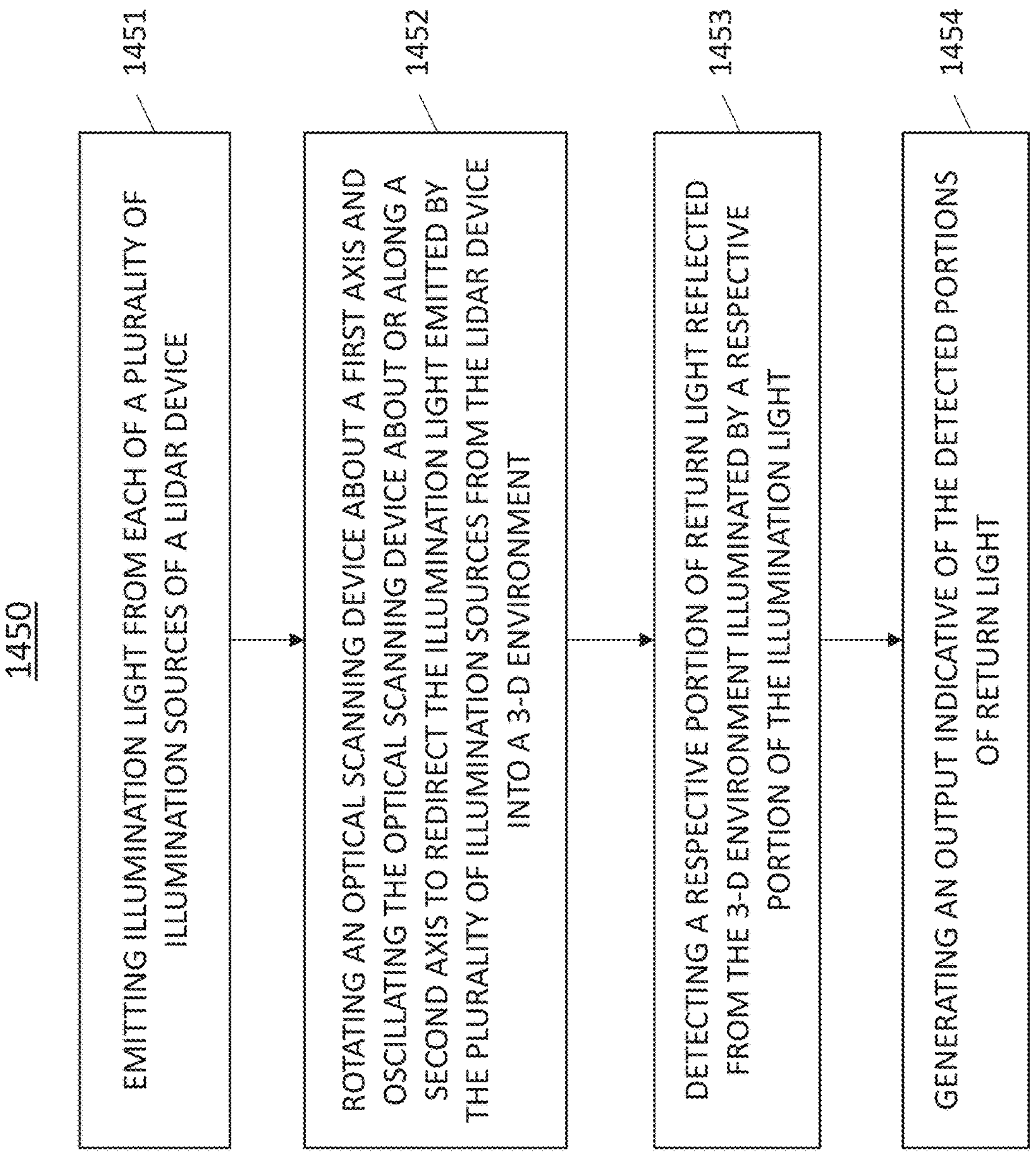
FIG. 14B depicts a flowchart illustrative of another method of performing multiple LIDAR measurements based on scanning measurement beams in accordance with some embodiments.

FIG. 14B illustrates a flowchart of a method 1450 suitable for implementation by a LIDAR system as described herein. In some embodiments, LIDAR system (or device) 800 of FIG. 8A and/or LIDAR system (or device) 210 of FIG. 6 is operable in accordance with method 1450 illustrated in FIG. 14B. However, in general, the execution of method 1450 is not limited to the embodiments of LIDAR systems (210, 800) described with reference to FIGS. 6 and/or 8A. These illustrations and corresponding explanation are provided by way of example as many other embodiments and operational examples may be contemplated.

In block 1451, illumination light is emitted from a plurality of illumination sources of a LIDAR device (e.g., light sources 801A-C of LIDAR system 800). The illumination light is incident on an optical scanning device disposed in an optical path of the plurality of illumination sources.

In block 1452, the optical scanning device is rotated about a first axis (e.g., axis 805) and oscillated about or along a second axis (e.g., axis 807) to redirect the illumination light emitted by the plurality of illumination sources from the LIDAR device into a three-dimensional (3-D) environment. In one example, the second axis is orthogonal to the first axis. The optical scanning device may include a scanning mirror (e.g., scanning mirror 803) configured to rotate about the first axis and oscillate about the second axis. In other examples, the scanning mirror can be configured to rotate about and oscillate along the same axis (i.e., the first axis and the second axis are the same axis). In another example, the optical scanning device includes a scanning lens (e.g., lens 213). In one example, the scanning lens rotates about and oscillates along the same axis (i.e., the first axis and the second axis are the same axis); however, in other examples, the scanning lens may be configured to rotate about the first axis and oscillate about the second axis.

In block 1453, a respective portion of return light reflected from the 3-D environment illuminated by a respective portion of the illumination light is detected by each of a plurality of photosensitive detectors. In one example, the optical scanning device is disposed in an optical path of the portions of return light reflected from the 3-D environment and configured to redirect the portions of return light towards the plurality of photosensitive detectors. In some examples, the plurality of illumination sources and the plurality of photosensitive detectors are stationary (e.g., with respect to a frame or housing of the LIDAR system) and redirecting the illumination light includes actuating the optical scanning device (e.g., scanning mirror 803) relative to the plurality of illumination sources and the plurality of photosensitive detectors.

In block 1454, an output indicative of the detected portions of return light is generated. In one example, the output is processed to determine a distance between the plurality of illumination sources and an object in the 3-D environment. Such processing can include measuring a difference between a first time when illumination light is emitted and second time when return light is detected.

In one example, redirecting the illumination light includes rotating the optical scanning device (e.g., scanning mirror 803) about the first axis across a plurality of measurement positions. In some examples, detecting the amount of return light reflected from the 3-D environment includes collecting a plurality of measurement points during a collection window corresponding to each measurement position of the plurality of measurement positions. The optical scanning device (e.g, scanning mirror 803) may be oscillated along the second axis during each collection window such that the plurality of collected measurement points include unique measurement points. In some examples, the optical scanning device is oscillated over an oscillation pattern during each collection window. The oscillation pattern may be a sinusoidal oscillation pattern. In certain examples, the illumination light emitted from the plurality of illumination sources includes a series of pulses having a non-linear timing pattern during each collection window.

Master controller 190 or any external computing system may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 192 implementing methods such as those described herein may be transmitted over a transmission medium such as a wire, cable, or wireless transmission link. For example, as illustrated in FIG. 1, program instructions 192 stored in memory 196 are transmitted to processor 195 over bus 194. Program instructions 192 are stored in a computer readable medium (e.g., memory 196). Exemplary computer-readable media include read-only memory, a random access memory, a magnetic or optical disk, or a magnetic tape.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As described above, an improved LIDAR system is provided herein. In at least one embodiment, the LIDAR system includes a scanning mirror configured to oscillate at high speeds orthogonal to the scan direction. In some examples, the oscillation of the scanning mirror enables the laser source to operate at higher firing rates to improve the utilization of each channel. In certain examples, the resolution of the LIDAR system can be improved (or maintained) while reducing system size and cost.

Some Examples of Continuous Wave (CW) LiDAR Systems

As discussed above, some LiDAR systems may use a continuous wave (CW) laser to detect the range and/or velocity of targets, rather than pulsed TOF techniques. Such systems include continuous wave (CW) coherent LiDAR systems and frequency modulated continuous wave (FMCW) coherent LiDAR systems. For example, any of the LiDAR systems (e.g., LiDAR system 100, 210, 300, 400, 800, 850, or 1200) described above can be configured to operate as an FMCW coherent LiDAR system.

Figure 15:
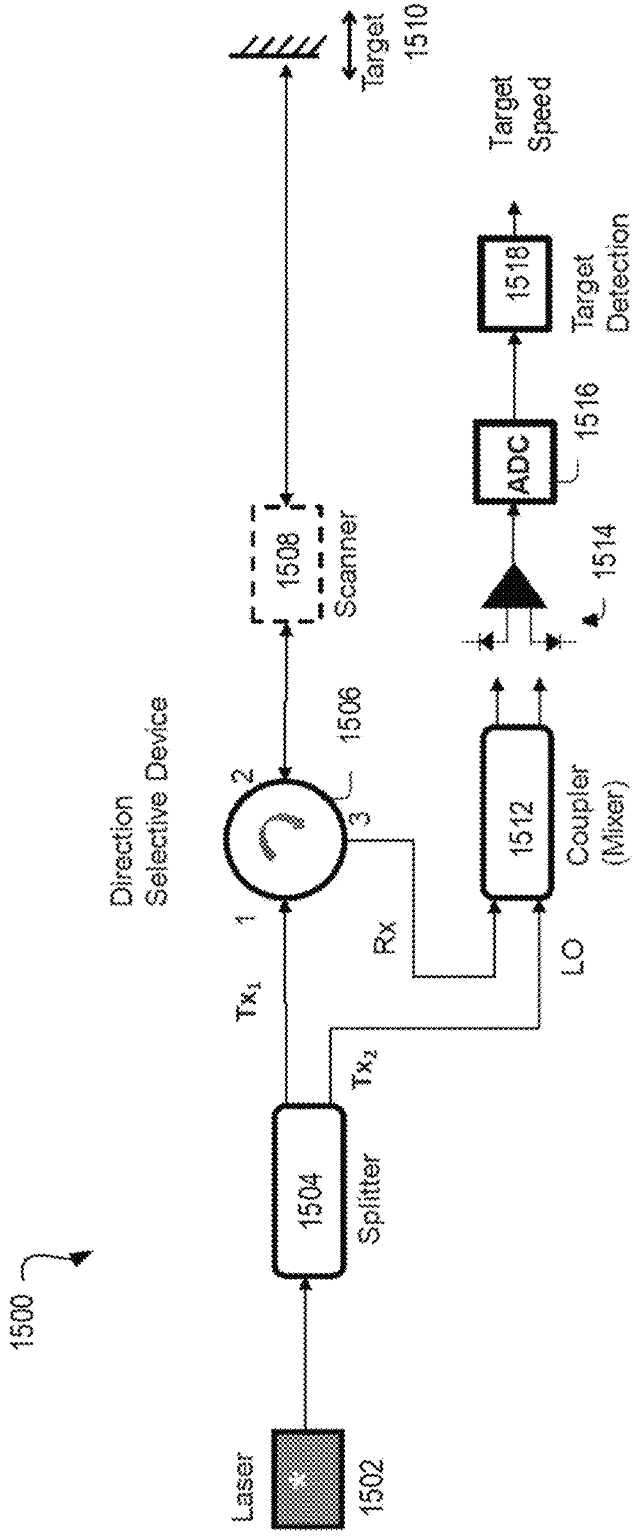
FIG. 15 is an illustration of an example continuous wave (CW) coherent LiDAR system.

FIG. 15 illustrates an exemplary CW coherent LiDAR system 1500 configured to determine the radial velocity of a target. LiDAR system 1500 includes a laser 1502 configured to produce a laser signal which is provided to a splitter 1504. The laser 1502 may provide a laser signal having a substantially constant laser frequency.

In one example, a splitter 1504 provides a first split laser signal Tx1 to a direction selective device 1506, which provides (e.g., forwards) the signal Tx1 to a scanner 1508. In some examples, the direction selective device 1506 is a circulator. The scanner 1508 uses the first laser signal Tx1 to transmit light emitted by the laser 1502 and receives light reflected by the target 1510 (e.g., "reflected light" or "reflections"). The reflected light signal Rx is provided (e.g., passed back) to the direction selective device 1506. The second laser signal Tx2 and reflected light signal Rx are provided to a coupler (also referred to as a mixer) 1512. The mixer may use the second laser signal Tx2 as a local oscillator (LO) signal and mix it with the reflected light signal Rx. The mixer 1512 may be configured to mix the reflected light signal Rx with the local oscillator signal LO to generate a beat frequency $f_{beat}$ when detected by a differential photodetector 1514. The beat frequency $f_{beat}$ from the differential photodetector 1514 output is configured to produce a current based on the received light. The current may be converted to voltage by an amplifier (e.g., transimpedance amplifier (TIA)), which may be provided (e.g., fed) to an analog-to-digital converter (ADC) 1516 configured to convert the analog voltage signal to digital samples for a target detection module 1518. The target detection module 1518 may be configured to determine (e.g., calculate) the radial velocity of the target 1510 based on the digital sampled signal with beat frequency $f_{beat}$.

In one example, the target detection module 1518 may identify Doppler frequency shifts using the beat frequency $f_{beat}$ and determine the radial velocity of the target 1510 based on those shifts. For example, the velocity of the target 1510 can be calculated using the following relationship:

$$f_d = \frac{2}{\lambda} v_t$$

where, $f_d$ is the Doppler frequency shift, $\lambda$ is the wavelength of the laser signal, and $v_t$ is the radial velocity of the target 1510. In some examples, the direction of the target 1510 is indicated by the sign of the Doppler frequency shift $f_d$. For example, a positive signed Doppler frequency shift may indicate that the target 1510 is traveling towards the system 1500 and a negative signed Doppler frequency shift may indicate that the target 1510 is traveling away from the system 1500.

In one example, a Fourier Transform calculation is performed using the digital samples from the ADC 1516 to recover the desired frequency content (e.g., the Doppler frequency shift) from the digital sampled signal. For example, a controller (e.g., target detection module 1518) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the LiDAR system 1500 is described above as being configured to determine the radial velocity of a target, it should be appreciated that the system can be configured to determine the range and/or radial velocity of a target. For example, the LIDAR system 1500 can be modified to use laser chirps to detect the velocity and/or range of a target.

Figure 16:
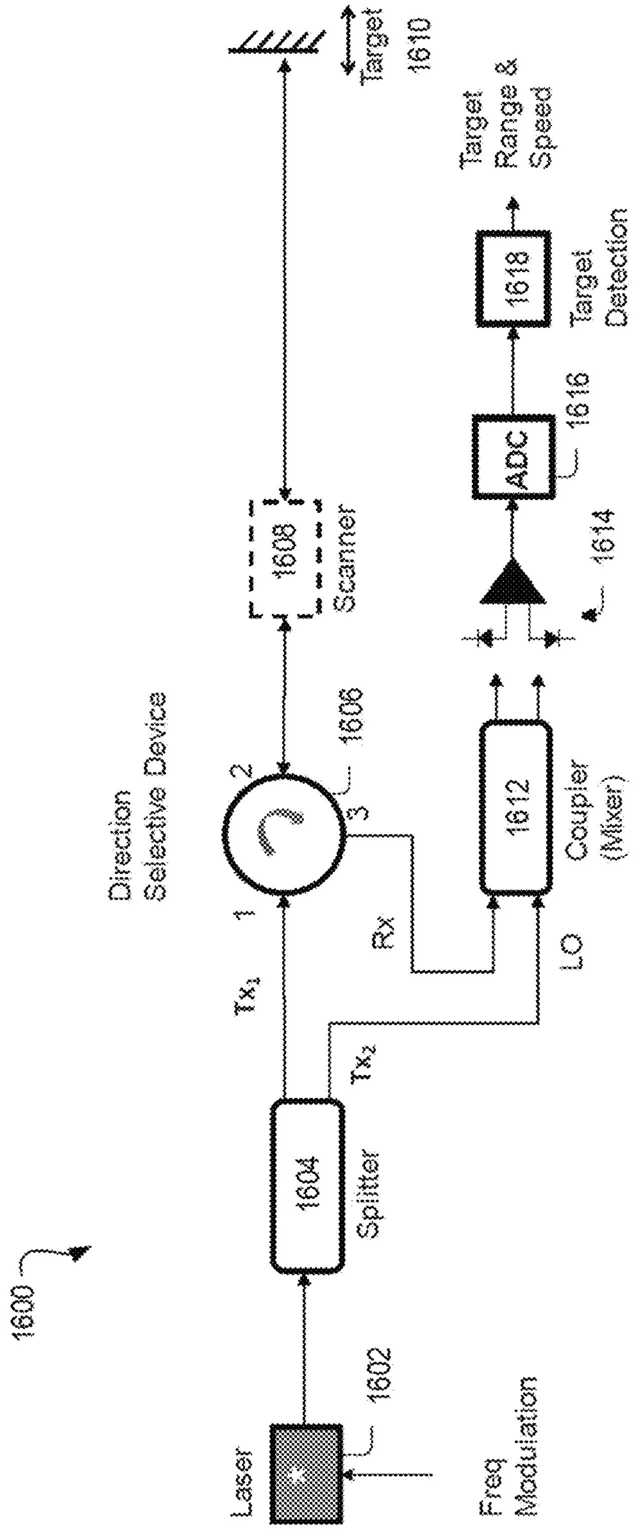
FIG. 16 is an illustration of another example frequency modulated continuous wave (FMCW) coherent LiDAR system.

FIG. 16 illustrates an exemplary FMCW coherent LiDAR system 1600 configured to determine the range and/or radial velocity of a target. LiDAR system 1600 includes a laser 1602 configured to produce a laser signal which is fed into a splitter 1604. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 1602; however, in other examples, an external modulator can be placed between the laser source 1602 and the splitter 1604.

In other examples, the laser frequency can be "chirped" by modulating the phase of the laser signal (or light) produced by the laser 1602. In one example, the phase of the laser signal is modulated using an external modulator placed between the laser source 1602 and the splitter 1604; however, in some examples, the laser source 1602 may be modulated directly by changing operating parameters (e.g., current/voltage) or include an internal modulator. Similar to frequency chirping, the phase of the laser signal can be increased ("ramped up") or decreased ("ramped down") over time.

Some examples of systems with FMCW-based LiDAR sensors have been described. However, the techniques described herein may be implemented using any suitable type of LiDAR sensors including, without limitation, any suitable type of coherent LiDAR sensors (e.g., phase-modulated coherent LiDAR sensors). With phase-modulated coherent LiDAR sensors, rather than chirping the frequency of the light produced by the laser (as described above with reference to FMCW techniques), the LiDAR system may use a phase modulator placed between the laser 1602 and the splitter 1604 to generate a discrete phase modulated signal, which may be used to measure range and radial velocity.

As shown, the splitter 1604 provides a first split laser signal Tx1 to a direction selective device 1606, which provides (e.g., forwards) the signal Tx1 to a scanner 1608. The scanner 1608 uses the first laser signal Tx1 to transmit light emitted by the laser 1602 and receives light reflected by the target 1610. The reflected light signal Rx is provided (e.g., passed back) to the direction selective device 1606. The second laser signal Tx2 and reflected light signal Rx are provided to a coupler (also referred to as a mixer) 1612. The mixer may use the second laser signal Tx2 as a local oscillator (LO) signal and mix it with the reflected light signal Rx. The mixer 1612 may be configured to mix the reflected light signal Rx with the local oscillator signal LO to generate a beat frequency $f_{beat}$. The mixed signal with beat frequency $f_{beat}$ may be provided to a differential photodetector 1614 configured to produce a current based on the received light. The current may be converted to voltage by an amplifier (e.g., a transimpedance amplifier (TIA)), which may be provided (e.g., fed) to an analog-to-digital converter (ADC) 1616 configured to convert the analog voltage to digital samples for a target detection module 1618. The target detection module 1618 may be configured to determine (e.g., calculate) the range and/or radial velocity of the target 1610 based on the digital sampled signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

$$\text{Range resolution: } \Delta R = \frac{c}{2BW} \text{(given a perfectly linear chirp), and}$$

$$\text{Range: } R = \frac{f_{beat} c T_{ChirpRamp}}{2BW}$$

where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent LiDAR systems may rely on two measurements having different slopes (e.g., negative and positive slopes) to remove this ambiguity. The two measurements having different slopes may also be used to determine range and velocity measurements simultaneously.

Figures 17A, 17B:
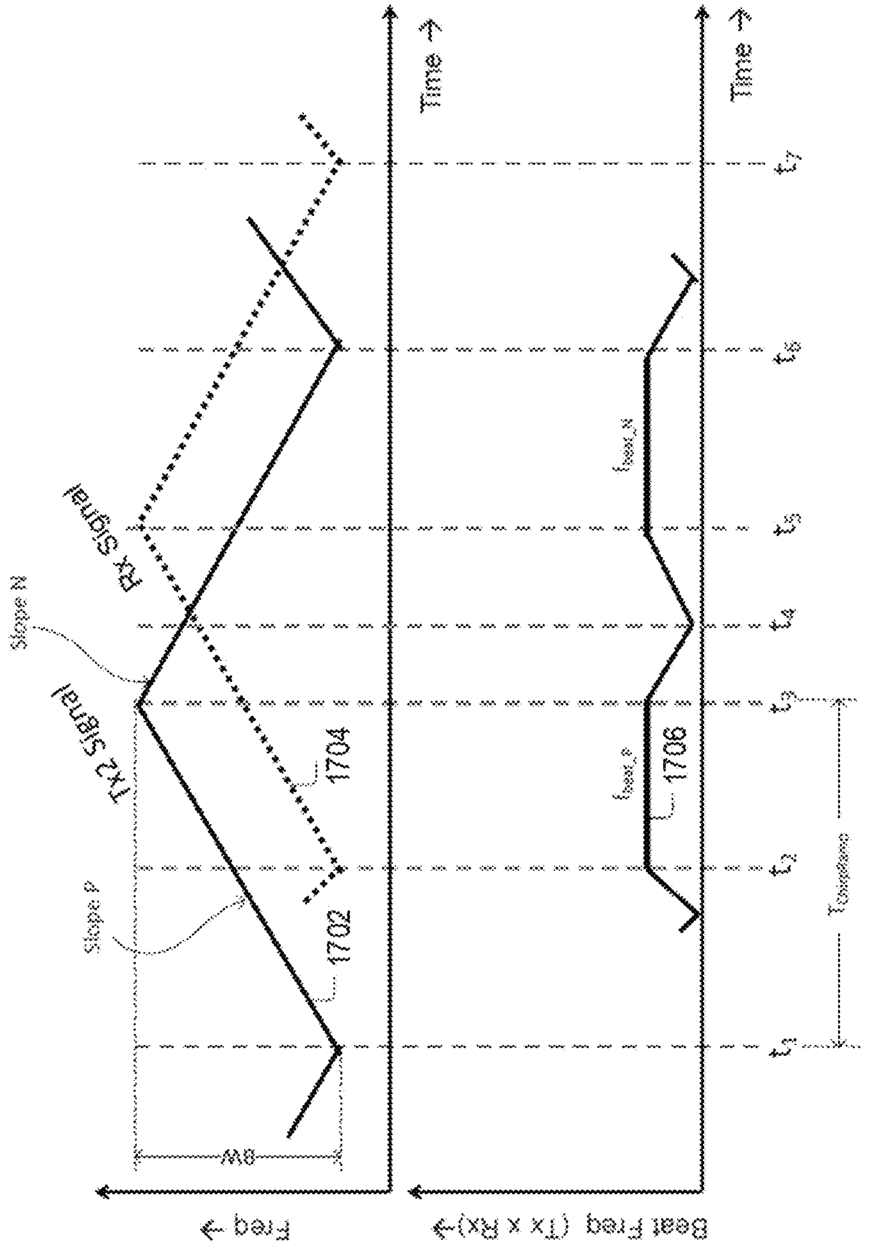
FIG. 17A is a plot of a frequency chirp as a function of time in a transmitted laser signal and reflected signal.
FIG. 17B is a plot illustrating a beat frequency of a mixed signal.

FIG. 17A is a plot of ideal (or desired) frequency chirp as a function of time in the transmitted laser signal Tx (e.g., signal Tx2), depicted in solid line 1702, and reflected light signal Rx, depicted in dotted line 1704. As depicted, the ideal Tx signal has a positive linear slope between time t1 and time t3 and a negative linear slope between time t3 and time t6. Accordingly, the ideal reflected light signal Rx returned with a time delay td of approximately t2-t1 has a positive linear slope between time t2 and time t5 and a negative linear slope between time t5 and time t7.

FIG. 17B is a plot illustrating the corresponding ideal beat frequency $f_{beat}$ 1706 of the mixed signal Tx2×Rx. Note that the beat frequency $f_{beat}$ 1706 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 17A-17B, when the positive and negative ramp pair is used to measure range and velocity simultaneously, the following relationships are utilized:

$$\text{Range: } R = \frac{c T_{ChirpRamp} \frac{(f_{beat\_P} + f_{beat\_N})}{2}}{2BW} \text{, and}$$

$$\text{Velocity: } V = \frac{\lambda \frac{(f_{beat\_P} - f_{beat\_N})}{2}}{2}$$

where $f_{beat\_P}$ and $f_{beat\_N}$ are beat frequencies generated during positive (P) and negative (N) slopes of the chirp 1702 respectively and λ is the wavelength of the laser signal.

In one example, the scanner 1608 of the LiDAR system 1600 is used to scan the environment and generate a target point cloud from the acquired scan data. In some examples, the LiDAR system 1600 can use processing methods that include performing one or more Fourier Transform calculations, such as a Fast Fourier Transform (FFT) or a Discrete Fourier Transform (DFT), to generate the target point cloud from the acquired scan data. Being that the system 1600 is capable of measuring range, each point in the point cloud may have a three-dimensional location (e.g., x, y, and z) in addition to radial velocity. In some examples, the x-y location of each target point corresponds to a radial position of the target point relative to the scanner 1608. Likewise, the z location of each target point corresponds to the distance between the target point and the scanner 1608 (e.g., the range). In one example, each target point corresponds to one frequency chirp 1702 in the laser signal. For example, the samples collected by the system 1600 during the chirp 1702 (e.g., t1 to t6) can be processed to generate one point in the point cloud.

Some Examples of Information Handling Systems

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price.

Figure 18:
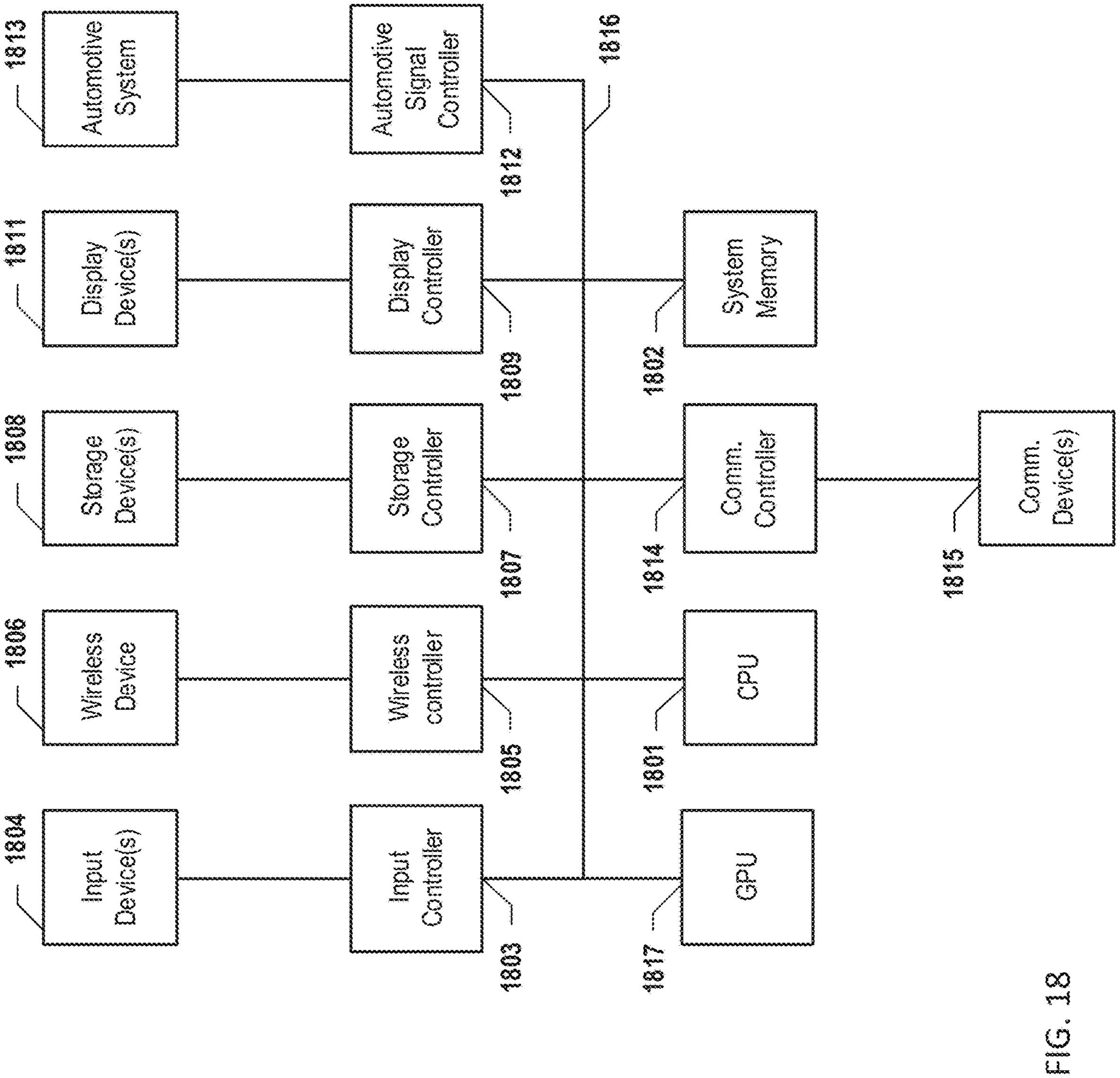
FIG. 18 shows a block diagram of a computing device/information handling system, in accordance with some embodiments.

FIG. 18 depicts a simplified block diagram of a computing device/information handling system (or computing system) according to embodiments of the present disclosure. It will be understood that the functionalities shown for system 1800 may operate to support various embodiments of an information handling system—although it shall be understood that an information handling system may be differently configured and include different components.

As illustrated in FIG. 18, system 1800 includes one or more central processing units (CPU) 1801 that provide(s) computing resources and control(s) the computer. CPU 1801 may be implemented with a microprocessor or the like, and may also include one or more graphics processing units (GPU) 1817 and/or a floating point coprocessor for mathematical computations. System 1800 may also include a system memory 1802, which may be in the form of random-access memory (RAM), read-only memory (ROM), or both.

A number of controllers and peripheral devices may also be provided. For example, an input controller 1803 represents an interface to various input device(s) 1804, such as a keyboard, mouse, or stylus. There may also be a scanner controller 1805, which communicates with a scanner 1806. System 1800 may also include a storage controller 1807 for interfacing with one or more storage devices 1808 each of which includes a storage medium such as magnetic tape or disk, or an optical medium that might be used to record programs of instructions for operating systems, utilities, and applications, which may include embodiments of programs that implement various aspects of the techniques described herein. Storage device(s) 1808 may also be used to store processed data or data to be processed in accordance with some embodiments. System 1800 may also include a display controller 1809 for providing an interface to a display device 1811, which may be a cathode ray tube (CRT), a thin film transistor (TFT) display, or other type of display. The computing system 1800 may also include an automotive signal controller 1812 for communicating with an automotive system 1813. A communications controller 1814 may interface with one or more communication devices 1815, which enables system 1800 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 1816, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into submodules or combined together.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "λ is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:

emitting illumination light from each of a plurality of illumination sources disposed within a housing of a light detection and ranging (LIDAR) device towards a monolithic scanning mirror disposed in a common optical path with the plurality of illumination sources;

oscillating the scanning mirror in a continuous sinusoidal pattern about a first axis while concurrently rotating the housing including the plurality of illumination sources, a plurality of photosensitive detectors disposed within the housing, and the scanning mirror about a second axis, orthogonal to the first axis, to redirect the illumination light emitted by the plurality of illumination sources from the LIDAR device into a three-dimensional (3-D) environment such that the emitted illumination light is scanned across the 3-D environment in at least two dimensions;

detecting, by each of a plurality of photosensitive detectors, a respective portion of return light reflected from the 3-D environment illuminated by a respective portion of the illumination light;

generating an output indicative of the detected portions of return light; and during each collection interval corresponding to a defined angular or temporal segment of the rotation of the housing, synchronizing the emission timing of each illumination source with the position of the oscillating scanning mirror, such that each illumination source is fired at a plurality of distinct scan positions, wherein the emission timing follows a non-linear pattern synchronized with the sinusoidal pattern to produce substantially uniform vertical spacing between the multiple spatially unique measurement points, and multiple spatially unique infill measurement points per channel are generated within each collection interval between primary scan paths defined by the rotation of the housing, thereby achieving a spatial sampling density that is greater than would be achieved by firing each illumination source only once per collection interval.

2. The method of claim 1, wherein the scanning mirror comprises a single-axis scanning mirror.

3. The method of claim 1, wherein the emission of the illumination light as the series of pulses having the non-linear timing pattern yields a sinusoidal pattern of measurement points in a plane substantially parallel to a surface of the scanning mirror.

4. The method of claim 1, further comprising:

processing the output to determine a distance between the plurality of illumination sources and an object in the 3-D environment.

5. The method of claim 4, wherein processing the output to determine the distance between the plurality of illumination sources and the object in the 3-D environment includes:

measuring a difference between a first time when one or more of the portions of the illumination light are emitted and second time when one or more portions of the return light are detected.

6. The method of claim 1, wherein oscillating the scanning mirror about the first axis includes oscillating the scanning mirror with an oscillation rate between approximately 18 kHz and approximately 22 kHz.

7. The method of claim 1, wherein the scanning mirror is configured to oscillate about the first axis at a frequency that is at least an order of magnitude greater than a rate of rotation of the housing about the second axis.

8. A light detection and ranging (LIDAR) device comprising:

a housing;

a plurality of illumination sources disposed within the housing, each of the plurality of illumination sources configured to emit illumination light;

a plurality of photosensitive detectors disposed within the housing, each configured to detect a respective portion of return light reflected from a three-dimensional (3-D) environment when illuminated by a respective portion of the illumination light;

a monolithic scanning mirror disposed within the housing in a common optical path of the plurality of illumination sources, the scanning mirror configured to oscillate about a first axis to redirect the illumination light emitted by the plurality of illumination sources from the LIDAR device into the 3-D environment and to redirect return light from the 3-D environment toward the plurality of photosensitive detectors;

a motor configured to rotate the housing, including the plurality of illumination sources, the plurality of photosensitive detectors, and the scanning mirror, about a second axis orthogonal to the first axis; and a controller operatively coupled to the plurality of illumination sources and the scanning mirror, the controller configured to, during operation;

(i) cause the scanning mirror to oscillate in a continuous sinusoidal pattern about the first axis while the housing or assembly is rotated about the second, orthogonal axis, such that the emitted illumination light is scanned across the 3-D environment in at least two dimensions and return light from the environment is directed to the photosensitive detectors; and (ii) during each collection interval corresponding to a defined angular or temporal segment of the housing rotation, cause each illumination source to be fired at a plurality of distinct scan positions by synchronizing the emission timing of each illumination source with the position of the oscillating scanning mirror, wherein the emission timing follows a non-linear pattern synchronized with the sinusoidal pattern to produce substantially uniform vertical spacing between the multiple spatially unique measurement points, such that multiple spatially unique infill measurement points per channel are generated within each collection interval between primary scan paths defined by the rotation of the housing, thereby achieving a spatial sampling density that is greater than would be achieved by firing each illumination source only once per collection interval.

9. The LIDAR device of claim 8, wherein the plurality of illumination sources and the plurality of photosensitive detectors are held stationary with respect to the housing as the housing rotates about the second axis, and wherein the scanning mirror is actuated to oscillate about the first axis and the housing is rotated about the second axis relative to the plurality of illumination sources and the plurality of photosensitive detectors.

10. The LIDAR device of claim 8, wherein the motor comprises a pancake motor operable to rotate the optical scanning device, the plurality of illumination sources, and the plurality of photosensitive detectors about the second axis at a same rate of rotation.

11. The LIDAR device of claim 8, wherein the emission of the illumination light as the series of pulses having the non-linear timing pattern yields a sinusoidal pattern of measurement points in a plane substantially parallel to a surface of the scanning mirror.

12. The LIDAR device of claim 8, further comprising: a fixed mirror disposed in the optical path between the plurality of illumination sources and the scanning mirror.

13. The LIDAR device of claim 8, further comprising:

a computing system configured to determine a distance between the LIDAR device and an object in the 3-D environment based on one or more of the portions of return light detected by one or more of the plurality of photosensitive detectors.

14. The LIDAR device of claim 13, wherein the computing system is configured to determine the distance between the LIDAR device and the object in the 3-D environment by measuring a difference between a first time when one or more of the portions of illumination light are emitted from one or more of the plurality of illumination sources and second time when one or more portions of the return light are detected by one or more of the plurality of photosensitive detectors.

15. The LIDAR device of claim 8, wherein the scanning mirror is oscillated about the first axis with an oscillation rate between approximately 18 kHz and approximately 22 kHz.

16. The LIDAR device of claim 8, wherein the scanning mirror is configured to oscillate about the first axis at a frequency that is at least an order of magnitude greater than a rate of rotation of the housing about the second axis.

17. A light detection and ranging (LIDAR) device comprising:

a housing;

a plurality of illumination sources disposed within the housing, each of the plurality of illumination sources configured to emit illumination light;

a plurality of photosensitive detectors disposed within the housing, each configured to detect a respective portion of return light reflected from a three-dimensional (3-D) environment when illuminated by a respective portion of the illumination light;

a monolithic scanning mirror disposed within the housing in a common optical path of the plurality of illumination sources, the scanning mirror configured to oscillate in a continuous sinusoidal pattern about a first axis to redirect the illumination light emitted by the plurality of illumination sources from the LIDAR device into the 3-D environment and to redirect return light from the 3-D environment toward the plurality of photosensitive detectors;

a motor configured to rotate the housing, including the plurality of illumination sources, the plurality of photosensitive detectors, and the scanning mirror, about a second axis orthogonal to the first axis; and a controller configured to, during operation, cause the motor to continuously rotate the housing about the second axis and cause the scanning mirror to oscillate about the first axis while the housing is being rotated;

wherein the controller is further configured to: (i) define, during the rotation of the housing, a plurality of data acquisition collection intervals, each data acquisition collection interval comprising a window during which a plurality of laser pulses are emitted and measurements are acquired, each data acquisition collection interval corresponding to a defined angular or temporal segment of the continuous rotation of the housing, and each data acquisition collection interval being distinct from the mere interval between consecutive single laser pulse emissions; and (ii) during each data acquisition collection interval, control the oscillation of the scanning mirror and the emission of illumination light such that multiple unique measurement points per channel are acquired, wherein the emission of illumination light follows a non-linear timing pattern synchronized with the sinusoidal pattern to produce substantially uniform vertical spacing between the multiple unique measurement points, and wherein the multiple unique measurement points comprise infill measurement points generated between primary scan paths defined by the continuous rotation of the housing, thereby increasing the spatial sampling density relative to a single firing per collection interval.

18. The LIDAR device of claim 17, wherein the motor is configured to rotate the housing through at least 360 degrees about the second axis to provide panoramic scanning of the environment.

19. The LIDAR device of claim 17 wherein the plurality of illumination sources and the plurality of photosensitive detectors are held stationary with respect to the housing as the housing rotates about the second axis.

20. The LIDAR device of claim 17, wherein the housing is rotated about the second axis at a rate of between 10-20 Hz.

21. The LIDAR device of claim 20, wherein the scanning mirror is configured to oscillate at a frequency between approximately 18 kHz and approximately 22 kHz.

22. The LIDAR device 17, wherein the plurality of illumination sources are arranged in a linear or two-dimensional array and the scanning mirror is configured to sweep beams emitted from each illumination source across at least a portion of the environment as the mirror oscillates and the housing rotates.

23. The LIDAR device of claim 17, wherein the spatial sampling density achieved by the device is at least an order of magnitude greater than would be achieved by firing each illumination source only once per rotational increment of the housing.

24. The LIDAR device of claim 17, wherein the scanning mirror is configured to oscillate about the first axis at a frequency that is at least an order of magnitude greater than a rate of rotation of the housing about the second axis.

* * * * *